United States Patent [19]

Wood et al.

[11] Patent Number: 5,690,707

[45] Date of Patent: Nov. 25, 1997

[54] ABRASIVE GRAIN COMPRISING MANGANESE OXIDE

[75] Inventors: William P. Wood, Golden Valley; Henry A. Larmie, Oakdale, both of Minn.

[73] Assignee: Minnesota Mining & Manufacturing Company, St. Paul, Minn.

[21] Appl. No.: 459,548

[22] Filed: Jun. 2, 1995

Related U.S. Application Data

[63] Continuation of Ser. No. 284,042, Aug. 1, 1994, abandoned, which is a continuation of Ser. No. 173,401, Dec. 21, 1993, abandoned, which is a continuation-in-part of Ser. No. 995,964, Dec. 23, 1992, abandoned.

[51] Int. Cl.$^6$ ............................................................ C09C 1/68
[52] U.S. Cl. ............................................ 51/309; 51/293
[58] Field of Search .................................. 51/293, 309, 295

[56] References Cited

U.S. PATENT DOCUMENTS

| | | |
|---|---|---|
| 2,347,685 | 5/1944 | Heany. |
| 2,360,841 | 10/1944 | Baumann, Jr. et al.. |
| 3,108,888 | 10/1963 | Bugosh. |
| 3,450,515 | 6/1969 | Amero. |
| 3,454,385 | 7/1969 | Amero. |
| 3,615,308 | 10/1971 | Amero. |
| 4,314,827 | 2/1982 | Leitheiser et al.. |
| 4,518,397 | 5/1985 | Leitheiser et al.. |
| 4,574,003 | 3/1986 | Gerk. |
| 4,623,364 | 11/1986 | Cottringer et al.. |
| 4,744,802 | 5/1988 | Schwabel. |
| 4,770,671 | 9/1988 | Monroe et al.. |
| 4,786,292 | 11/1988 | Janz et al.. |
| 4,799,938 | 1/1989 | Janz et al.. |
| 4,881,951 | 11/1989 | Wood et al.. |
| 4,913,708 | 4/1990 | Kalinoski. |
| 4,960,441 | 10/1990 | Pellow et al.. |
| 4,964,883 | 10/1990 | Morris et al.. |
| 4,997,461 | 3/1991 | Markhoff-Matheny et al.. |
| 5,034,360 | 7/1991 | Bartels et al.. |
| 5,035,723 | 7/1991 | Kalinowski et al.. |
| 5,053,369 | 10/1991 | Winkler et al.. |
| 5,076,815 | 12/1991 | Kunz et al.. |
| 5,131,926 | 7/1992 | Rostoker et al.. |
| 5,139,978 | 8/1992 | Wood. |
| 5,147,833 | 9/1992 | Manning et al.. |
| 5,164,348 | 11/1992 | Wood. |
| 5,190,567 | 3/1993 | Tamamaki et al.. |
| 5,192,339 | 3/1993 | Hasegawa et al.. |
| 5,194,072 | 3/1993 | Rue et al.. |
| 5,204,300 | 4/1993 | Kumagai et al.. |
| 5,215,551 | 6/1993 | Hatanaka et al.. |

FOREIGN PATENT DOCUMENTS

| | | | |
|---|---|---|---|
| 394850 | 12/1991 | Austria | C04B 35/10 |
| 0 256 182 | 2/1988 | European Pat. Off. | C04B 35/10 |
| 0 408 771 A1 | 1/1991 | European Pat. Off. | C04B 35/10 |
| 0 409 991 | 1/1991 | European Pat. Off. | C09K 3/14 |
| 441 640 A2 | 8/1991 | European Pat. Off. | C04B 35/10 |
| 0 497 241 A1 | 8/1992 | European Pat. Off. | C04B 35/10 |
| WO 92/01646 | 2/1992 | WIPO | C04B 35/10 |

OTHER PUBLICATIONS

Wakao et al., "Effects of Metallic Oxides on α–Transformation of Alumina," *Reports of Nagoya Industrial Research Institute*, vol. 11, No. 9, Sep. 1962, pp. 588–595.

Vereshchagin et al., "Kinetics and Mechanism of Transformations of Low–Temperature Forms of Alumina in α–Aluminum Oxide in the Presence of Additives," *STN International, American Chemical Society*, Abstract, 1985, p. 29.

Keski et al., "Effect of Manganese Oxide on Sintering of Alumina," *J. Am. Ceram. Soc.*, vol. 48, No. 12, Dec. 1965, pp. 653–654.

Lee et al., "Thermal Decomposition of Manganese Oxyhydroxide," *Journal of Solid State Chemistry*, vol. 31, 1980, pp. 81–93.

Erickson et al., "In Situ Whisker Growth In Sol Gel Abrasive Grain," Talk given at 43rd Pacific Coast Regional Meeting, Pacific Northwest Section of the American Ceramic Society, Inc., Oct. 25–27, 1990 (copy of talk outline and slides enclosed).

Tsai et al., "Transformation Plasticity and Toughening inCeO$_2$–Partially–Stablilized Zirconia–Alumina (Ce–TZP/Al$_2$O$_3$) Composites Doped with MNO," *J. Am. Ceram. Soc.*, 75 [5], 1992, pp. 1229–1238.

Cutler et al, "Sintering of Alumina at Temperatures of 1400° C. and Below," *Journal of the American Ceramic Society*, vol. 40, Apr. 1957, pp. 134–139.

Cahoon et al. "Sintering and Grain Growth of Alpha–Alumina," *Journal of The American Ceramic Society*, vol. 39, No. 10, Oct. 1956, pp. 337–344.

Jones et al. "Role of Structural Defects in the Sintering of Alumina and Magnesia," *Journal of The American Ceramic Society*, vol. 41, No. 9, Sep. 1958, pp. 353–357.

Baggaley, B.J. "The Sintering Mechanism of Alumina and The Effects of Additions of Titanium and Manganese" PhD Thesis, Submitted to the University of New South Wales, Nov. 1985, pp. 1–308.

*Primary Examiner*—Deborah Jones
*Attorney, Agent, or Firm*—Gary L. Griswold; Walter N. Kirn, Jr.; Gregory D. Allen

[57] ABSTRACT

Abrasive grain including manganese oxide therein are provided. The inclusion of manganese oxide can be utilized to reduce the transition temperature of transitional alumina(s) to alpha alumina(s), during the formation of the abrasive grain. Further, manganese oxide presence can be utilized to generate sintered abrasive grain having a submicrometer, faceted microstructure. The abrasive grain are useful in abrasive articles such as coated abrasives, three-dimensional, low density abrasives, and bonded abrasives.

51 Claims, 6 Drawing Sheets

ABRASIVE GRAIN COMPRISING MANGANESE OXIDE

This is a continuation of U.S. Ser. No. 08/284,042, filed Aug. 1, 1994, now abandoned, which is a continuation of U.S. Ser. No. 08/173,401, filed Dec. 21, 1993, now abandoned, which in turn is a continuation-in-part of U.S. Ser. No. 07/995,964, filed Dec. 23, 1992, now abandoned.

FIELD OF THE INVENTION

The present invention relates to alumina-based ceramics comprising manganese oxide, and a method of making the same.

DESCRIPTION OF THE RELATED ART

The abrasives industry generally concerns abrasive products comprising binder and a plurality of abrasive grain used to abrade a workpiece (e.g., stainless steel). Desirable abrasive grain are hard, tough, and chemically resistant to the workpiece being abraded. The hardness property is associated with the abrasive grain not yielding from forces of grinding and not dulling. The toughness property is associated with strength and fracture resistance of the abrasive grain.

In general, it is known that inclusion of various materials within an alpha alumina-based abrasive grain will modify the characteristics of the grain.

SUMMARY OF THE INVENTION

The present invention provides an abrasive grain comprising a ceramic alpha alumina-based material having a submicrometer, faceted microstructure, and having therein at least 0.1 percent by weight manganese oxide (calculated on a theoretical oxide basis as MnO) and at least 0.1 percent by weight material selected from the group consisting of zirconium oxide, yttrium oxide, lanthanum oxide, neodymium oxide, cerium oxide, praseodymium oxide, samarium oxide, gadolinium oxide, erbium oxide, ytterbium oxide, dysprosium oxide, europium oxide, hafnium oxide, and mixtures thereof (calculated on a theoretical oxide basis as $ZrO_2$, $Y_2O_3$, $La_2O_3$, $Nd_2O_3$, $Ce_2O_3$, $Pr_2O_3$, $Sm_2O_3$, $Gd_2O_3$, $Er_2O_3$, $Yb_2O_3$, $Dy_2O_3$, $Eu_2O_3$ and $HfO_2$, respectively), based on the total weight of the ceramic alpha alumina-based material. Preferably, the abrasive grain material has an average hardness of at least 19 GPa, more preferably, at least 20 GPa.

Manganese is capable of a number of oxidation states and thus manganese oxide can take a variety of formulae, (e.g., MnO, $MnO_2$, $Mn_2O_3$, $Mn_3O_4$, etc.). Herein the term "manganese oxide" is generally intended to refer to any of the oxides of manganese. When, however, reference is made to a percent by weight of manganese, it is calculated on a theoretical oxide basis as MnO.

In another aspect, the present invention provides an abrasive grain comprising a ceramic alpha alumina-based material having an alpha alumina submicrometer, faceted microstructure and having therein:

(a) at least 0.1 percent by weight manganese oxide; and
(b) at least 0.1 percent by weight oxide selected from the group consisting of yttrium oxide, zirconium oxide, lanthanum oxide, neodymium oxide, cerium oxide, praseodymium oxide, samarium oxide, gadolinium oxide, erbium oxide, ytterbium oxide, dysprosium oxide, europium oxide, hafnium oxide and mixtures thereof, based on the total weight of the ceramic alpha alumina-based material, wherein the manganese oxide and the oxide of (b) are collectively present in an amount sufficient to provide an abrasive grain having an average hardness of at least 19 GPa (preferably, at least 20 GPa).

When it is said that the abrasive grain includes, for example, yttrium oxide, rare earth oxide, etc. it is meant that the abrasive grain includes the presence of those components, not that such an oxide is necessarily present itself. Some yttrium oxide may be present, for example, in a reaction product.

In another aspect, the present invention provides a method of making an abrasive grain comprising a ceramic alpha alumina-based material having a submicrometer, faceted microstructure, the method comprising the steps of:

(a) providing an alpha alumina-based ceramic abrasive grain precursor comprising an effective amount of manganese material (i.e., manganese oxide and/or precursor thereof); and
(b) heating (e.g., sintering and, if necessary, calcining before sintering) the alpha alumina-based ceramic abrasive grain precursor to form the alpha alumina-based ceramic abrasive grain comprising a ceramic alpha alumina-based material having a submicrometer, faceted microstructure.

In another aspect, the present invention provides a method of making alpha alumina-based ceramic abrasive grain, the method comprising the steps of:

(a) providing an alpha alumina-based ceramic abrasive grain precursor comprising an effective amount of manganese material to reduce the transitional to alpha alumina transformation temperature (typically by at least 20° C.); and
(b) heating the alpha alumina-based ceramic abrasive grain precursor to provide alpha alumina-based ceramic abrasive grain, wherein the heating includes sintering in a non-oxidizing atmosphere (e.g., nitrogen or 95% nitrogen/5% hydrogen).

The amount of manganese material (calculated on a theoretical oxide basis as MnO) needed to achieve reduction in the transformation temperature depends on what, if any, other materials are present in the abrasive grain precursor.

In yet another aspect, the present invention provides a method of making alpha alumina-based ceramic abrasive grain, the method comprising the steps of (a) providing an alpha alumina-based ceramic precursor comprising an effective amount of manganese material to reduce the transitional to alpha alumina transformation temperature and a sufficient amount of rare earth material selected from the group consisting of lanthanum oxide, neodymium oxide, cerium oxide, praseodymium oxide, samarium oxide, gadolinium oxide, erbium oxide, ytterbium oxide, dysprosium oxide, precursors thereof, and mixtures thereof to provide when heated according to step (b), an alpha alumina ceramic abrasive grain comprising at least 0.1 present by weight rare earth oxide selected from the group consisting of lanthanum oxide, neodymium oxide, cerium oxide, praseodymium oxide, samarium oxide, gadolinium oxide, erbium oxide, ytterbium oxide, dysprosium oxide, and mixtures thereof, based on the total weight of the alpha alumina-based ceramic abrasive grain; and
(b) heating the alpha alumina-based ceramic abrasive grain precursor to provide alpha alumina-based ceramic abrasive grain.

Herein the term "reduction in transformation temperature" is intended to refer to any reduction in the temperature at which transitional alumina(s) converts to alpha alumina. Typically, temperature reductions on the order of about 20° C. are significant. As indicated by the examples reported herein, reductions of at least 50° C., indeed 100° C. or more, can be obtained.

In yet another aspect, the present invention provides a method for making alpha alumina-based ceramic abrasive grain, the method comprising the steps of:

(a) providing an alpha alumina-based ceramic precursor comprising manganese material and rare earth material selected from the group consisting of lanthanum oxide, neodymium oxide, cerium oxide, praseodymium oxide, samarium oxide, gadolinium oxide, erbium oxide, ytterbium oxide, dysprosium oxide, europium oxide, precursors thereof, and mixtures thereof, wherein the presence of the rare earth material increases the alpha alumina transformation temperature and the manganese material is present in an amount sufficient to offset an increase in the alpha alumina transformation temperature due to the presence of the rare earth material; and (b) heating the alpha alumina-based ceramic abrasive grain precursor to provide alpha alumina-based ceramic abrasive grain.

In yet another aspect, the present invention provides an alpha alumina-based abrasive grain precursor comprising alpha alumina precursor, manganese material, and rare earth material selected from the group consisting of lanthanum oxide, neodymium oxide, cerium oxide, praseodymium oxide, samarium oxide, gadolinium oxide, europium oxide, erbium oxide, ytterbium oxide, dysprosium oxide, precursors thereof, and mixtures thereof, a sufficient stoichiometric excess of manganese oxide, calculated as MnO, relative to the rare earth material, calculated as rare earth oxide, to provide when sintered a sintered alpha alumina-based ceramic abrasive grain having a submicrometer, faceted microstructure.

In yet another aspect, the present invention provides an abrasive grain comprising a ceramic alpha alumina-based material including manganese oxide in the range from 0.1 to about 10 percent (preferably, about 2 to about 10 percent) by weight and rare earth oxide in the range from 0.1 to about 10 percent (preferably, 0.1 to about 6 percent) by weight, based on the total weight of the ceramic alpha alumina-based material, wherein the manganese oxide and the rare earth oxide are collectively present in an amount sufficient to provide an abrasive grain having an average hardness of at least 19 GPa (preferably, at least 20 GPa).

In yet another aspect, the present invention provides an alpha alumina-based abrasive grain precursor comprising alpha alumina precursor, zirconium material, and manganese material, wherein the manganese material is present in a stoichiometric excess by weight, calculated as MnO, relative to the zirconium material, calculated as $ZrO_2$, to provide when sintered a sintered alpha alumina-based ceramic having a submicrometer, faceted microstructure.

In yet another aspect, the present invention provides an abrasive grain comprising a ceramic alpha alumina-based material including manganese oxide in the range from 0.1 to about 10 percent by weight and zirconium oxide in the range from 0.1 to 2 percent by weight, based on the total weight of the ceramic alpha alumina-based material.

In yet another aspect, the present invention provides a method for making alpha alumina-based ceramic abrasive grain, the method comprising the steps of:

(a) providing an alpha alumina-based ceramic precursor comprising alpha alumina precursor, manganese material, and nucleating material, wherein the manganese material and the nucleating material are present in an amount sufficient to reduce the sintering temperature of step (b) by at least 20° C. (preferably, at least 50° C., more preferably, at least 100° C., even more preferably, at least 150° C.), as compared to a comparable alpha alumina-based ceramic precursor that is essentially free of manganese material; and (b) heating the alpha alumina-based ceramic abrasive grain precursor to a sintering temperature for a time sufficient to provide alpha alumina-based ceramic abrasive grain having a density of at least 95 percent of theoretical and alpha alumina crystallites having an average crystallite size of less than 1 micrometer.

"Comparable alpha alumina-based ceramic precursor" as used herein refers to an alpha alumina-based ceramic precursor which is the same as and was prepared the same as the precursor to which it is being compared except the comparable alpha alumina-based ceramic precursor is essentially free of manganese material.

In yet another aspect, the present invention provides a calcined alpha alumina-based ceramic abrasive grain precursor capable of being sintered to provide alpha alumina-based ceramic abrasive grain having a density of at least 95 percent of theoretical and alpha alumina crystallites having an average crystallite size of less than 1 micrometer, the calcined abrasive grain precursor comprising alpha alumina precursor, manganese material, and nucleating material, wherein the manganese material and the nucleating material are present in an amount sufficient to reduce the temperature required to sinter the calcined alpha alumina-based ceramic abrasive grain precursor by at least 20° C. (preferably, at least 50° C., more preferably, at least 100° C., even more preferably, at least 150° C.), as compared to a comparable calcined alpha alumina-based ceramic precursor that is essentially free of manganese material, when the calcined abrasive grain precursor is sintered for the same period of time as the comparable abrasive grain precursor.

"Comparable calcined alpha alumina-based ceramic precursor" as used herein refers to a calcined alpha alumina-based ceramic precursor which is the same as and was prepared the same as the precursor to which it is being compared except the comparable calcined alpha alumina-based ceramic precursor is essentially free of manganese material.

Although, in general, methods of providing a submicrometer, faceted microstructure frequently are associated with lowering the transformation temperature, the lowering of the transformation temperature is not an essential requirement to provide a faceted, submicrometer microstructure.

In another aspect, the present invention provides a method of making an abrasive grain comprising a ceramic alpha alumina-based material, the alpha alumina-based material having a density of at least 90 percent of theoretical and an alpha alumina submicrometer, faceted microstructure provided by the presence of (i) alumina, (ii) at least 0.1 percent by weight manganese oxide, and (iii) at least 0.1 percent by weight secondary oxide selected from the group consisting of zirconium oxide, yttrium oxide, lanthanum oxide, neodymium oxide, cerium oxide, praseodymium oxide, samarium oxide, gadolinium oxide, erbium oxide, ytterbium oxide, dysprosium oxide, hafnium oxide, and mixtures thereof, based on the total weight of the ceramic alpha alumina-based material, the method comprising the steps of:

(a) providing an alpha alumina-based ceramic abrasive grain precursor comprising (A) manganese material and (B) secondary oxide, precursors thereof (i.e., precursors of the secondary oxide), and mixtures thereof (i.e., secondary oxide and precursors thereof) and (b) heating the alpha alumina-based ceramic abrasive grain precursor to provide the alpha alumina-based ceramic abrasive grain.

Optionally, the abrasive grain further comprises at least 0.1 percent by weight of an oxide selected from the group consisting of zinc oxide, magnesium oxide, nickel oxide, silicon oxide, chromium oxide, titanium oxide, cobalt oxide, and combinations thereof, based on the total weight of the alpha alumina-based ceramic abrasive grain.

Abrasive grain according to the present invention is useful in abrasive products (e.g., coated abrasives, three-dimensional, low density ("nonwoven") abrasives, cutoff wheels, and grinding wheels).

DETAILED DESCRIPTION OF THE PREFERRED EMBODIMENTS

Figure 1:
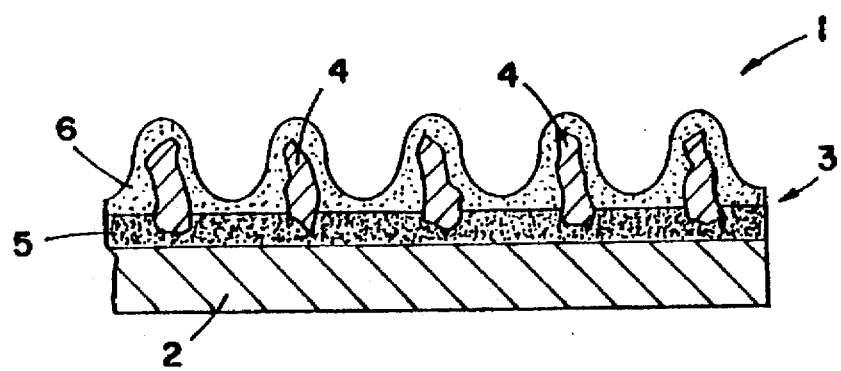
FIG. 1 is a partial cross-sectional schematic view of a coated abrasive article having abrasive grain according to the present invention incorporated therein.

Abrasive grain according to the present invention is typically hard (e.g., has a hardness of about 20 GPa or more) and tough (e.g., has a toughness of about 3.5 MPa·m$^{1/2}$ or more).

Herein the terms "abrasive grain," "ceramic abrasive grain," or variants thereof are used to refer to the granular abrasive material after it has been prepared (sintered) for inclusion in an abrasive product. The terms "base grit," "base grit material," "abrasive grain precursor," "ceramic precursor," or variants thereof are used to refer to ceramic precursors which, when sintered or calcined and sintered, provide ceramic abrasive grain.

The General Affects of Manganese Oxide Inclusion Within Alumina-Based Ceramic Grain The presence of manganese oxide in the abrasive grain precursor under circumstances such as described herein results in reduction of the transformation temperature for conversion of transitional alumina(s) to the alpha alumina. The reduction in transition temperature is typically at least 20° C., preferably 50° C., and more preferably, at least 100° C. It has been observed that this reduction in transformation temperature can lead to modification in the microstructure of the resulting abrasive grain. Further, inclusion of oxide modifiers (secondary component(s) in addition to manganese oxide can lead to further modification of the microstructure within the (sintered,) ceramic abrasive grain. Variations in the microstructure of the abrasive grain are known to relate to product performance.

If the precursor which is sintered to form the ceramic abrasive grain consists essentially of alpha alumina precursor and manganese material (i.e., manganese oxide and/or precursor thereof), then, during sintering, a spinel structure typically forms. The spinel ($MnAl_2O_4$) is the reaction product of aluminum oxide and manganese oxide. This spinel will be present in the abrasive grain as a secondary phase along with a major alpha alumina phase. It is theorized a cubic structure or an alpha crystal structure of manganese oxide (i.e., alpha $Mn_2O_3$) forms, which reacts during sintering with aluminum oxide to form the $MnAl_2O_4$ spinel.

If the precursor to the ceramic abrasive grain consists essentially of alpha alumina precursor and manganese material, the microstructure of the sintered abrasive grain typically has a vermicular microstructure. However, if an effective amount of a secondary component material selected from the group consisting of zirconium oxide, yttrium oxide, lanthanum oxide, neodymium oxide, cerium oxide, praseodymium oxide, samarium oxide, gadolinium oxide, erbium oxide, ytterbium oxide, dysprosium oxide, hafnium oxide, precursors thereof, and mixtures thereof, is provided, a submicrometer, faceted alpha alumina microstructure results. If more than an effective amount of a secondary component is present, a cellular microstructure typically results. A cellular microstructure comprises cells each having a collection of submicrometer alpha alumina crystallites. Adjacent submicrometer alpha alumina crystallites may have low angle grain boundaries between them. The alpha alumina crystallites are crystallographically oriented within the cell.

The presence of manganese material, depending in part upon what other oxide(s) and/or precursor(s) thereof (i.e., secondary component(s)) is present, generally results in a lowering of the temperature for the transitional alumina(s) to alpha alumina transformation. In general, it has been determined by differential thermal analysis (DTA) that the presence of manganese oxide lowers the transformation temperature of the transitional alumina(s) to alpha alumina by about 50 to about 200° C. (preferably, about 100° C. to about 200° C). The actual temperature reduction depends upon various factors such as the relative amount (i.e., concentration) of manganese oxide, the presence of other oxides, and the oxidation state of the manganese ions.

Further, the sintering temperature of the alpha alumina-based abrasive grain can be lowered by the presence of manganese oxide and nucleating material, as compared to an alpha alumina-based abrasive grain which is the same as and was prepared the same as the alpha alumina-based abrasive grain to which it is being compared except the comparable alpha alumina-based abrasive grain is essentially free of manganese material. Preferably, a sufficient amount of manganese oxide is present with the nucleating material to lower sintering temperature by at least 20° C., more preferably, at least 50° C., even more preferably, by at least 100° C., and most preferably, by at least 150° C. Thus, energy savings and reduced kiln wear during the sintering process result.

A preferred atmosphere for sintering abrasive grain precursor comprising transitional alumina(s) and manganese material may be a neutral (e.g., nitrogen) or reducing (e.g., a nitrogen/hydrogen mixture) atmosphere. It is theorized that a non-oxidizing atmosphere controls the oxidative state of the manganese ion and results in abrasive grain having improved abrading characteristics. The average hardness of ceramic abrasive grain derived from precursor consisting essentially of transitional alumina(s) and manganese material is about 12 to about 14 GPa.

A preferred abrasive grain according to the present invention includes a aluminate phase(s) represented by the formula $MnLnAl_{11}O_{19}$, wherein Mn is manganese, Al is aluminum, O is oxygen, and Ln is a trivalent metal ion such as an ion of La, Nd, Ce, Pr, Sm, Gd, Dy, Eu, or Er. Such aluminate exhibits a magnetoplumbite crystal structure, and generally forms before any other manganese oxide reaction product. If excess manganese is present, then a manganese spinel (i.e., $MnAl_2O_4$) typically forms. During sintering in the presence of both manganese oxide and secondary components, there may be minor amounts of transitional manganese oxides formed (e.g., $Mn_2O_3$). If excess lanthanum is present, beta alumina can form in addition to aluminate.

Some of the secondary components may react with aluminum oxide and not with manganese oxide. That is, sometimes aluminum oxide and a secondary component(s) product form in addition to an aluminum oxide/manganese oxide/secondary component(s) product. For example, the sintered reaction product of dysprosium oxide and ytterbium oxide with aluminum oxide will generally be a garnet. The sintered reaction product of praseodymium oxide, gadolinium oxide, erbium oxide, and samarium oxide with aluminum oxide will generally be a pervoskite, which may include garnet. Yttrium oxide can react with aluminum oxide to form a garnet structure (i.e., $Y_3Al_5O_{12}$).

Control of the generation of different possible reaction products in the major alpha alumina phase can be effected by monitoring and controlling the identity of, and amounts of, various oxide(s) (and/or oxide precursor(s)) present in the abrasive grain precursor. The reaction product(s) is strongly dependent on the particular secondary component present and the ratios of the secondary component to manganese oxide in the amount of aluminum oxide.

Preferably, abrasive grain according to the present invention is derived from a hydrated alpha alumina. During formation of the abrasive grain, hydrated alumina is typically transformed into various transitional aluminas (e.g., gamma alumina, delta alumina, theta alumina, etc.) and then converted to alpha alumina. Such transitional aluminas generally have cubic crystal structures. The final sintered alpha alumina ceramic, however, has a hexagonal crystal structure.

Depending upon the relative amounts of aluminum oxide, manganese oxide, and secondary component (if any) in the abrasive grain precursor, different sintered abrasive grain microstructures result. The microstructures are characterized as vermicular; submicrometer, faceted; cellular; and lath-like. The selection and amount of secondary component(s) relative the amount of manganese oxide significantly influences the microstructure of the sintered abrasive grain.

Herein, the term "submicrometer, faceted microstructure" and variants thereof is meant to refer to microstructures wherein the major alpha alumina phase comprises equiaxed alpha alumina crystallites having an average crystal size of 1 micrometer or less. The crystallites are randomly oriented with respect to each other and do not show orientation with respect to adjacent crystallites as in a cellular microstructure when viewed under an optical microscope using transmitted light and cross polars at 160× with the sample immersed in a fluid having an index of refraction of 1.760 (commercially available, for example, under the trade designation "CARGILE CERTIFIED REFRACTIVE INDEX LIQUIDS" from R. T. Cargile Labs). Such microstructures result from the presence of manganese oxide, as described herein, and are generally associated with relatively hard, dense abrasive grain. In many instances, the smaller the crystallites, the harder the material having the submicrometer, faceted microstructure.

For a cellular microstructure, the alpha alumina crystallites are typically between 0.1 to about 0.5 micrometer in diameter, whereas the cell is typically about 1 to about 10 micrometers in diameter. Platelets of hexagonal rare earth aluminate reaction product (e.g., magnetoplumbites, i.e., a reaction product represented by the formula $MnLnAl_{11}O_{19}$) are sometimes distributed within the cells and between the cells. The platelets are typically about 0.5 to about 1 micrometer long, and about 0.05 micrometer thick. It is theorized that the platelets reinforce the alumina cells, thereby increasing toughness of the sintered abrasive grain by inhibiting crack propagation. Depending upon what other reaction product(s) is formed during sintering, submicrometer particles of a secondary component or manganese oxide may also be present.

A lath-like microstructure comprises a collection or cell of submicrometer alpha alumina grain as described above with respect to the cellular microstructure. Within the cell, however, are lath-like crystals (typically beta alumina crystals having a length greater than about 1 micrometer). Such a lath-like structure, however, is typically not preferred because beta alumina is softer than alpha alumina. The lath-structure generally forms if an excess of lanthanum oxide is present.

A vermicular microstructure comprises a combination of open and dense regions. The dense regions are connected to other dense regions by bridges. A vermicular microstructure typically forms if insufficient levels of rare earth oxide, yttrium oxide, or zirconium oxide are present.

Typically, abrasive grain having a submicrometer, faceted microstructure can be provided by sintering at a temperature lower than that necessary to obtain about the same (or even greater) density in abrasive grain having a cellular microstructure. That is, abrasive grain having a submicrometer, faceted microstructure preferably can be provided by sintering at a temperature of about 1300° C. to about 1350° C., whereas abrasive grain having a cellular microstructure is generally provided by sintering above about 1350° C. (typically about 1350° to about 1450° C). It is noted, however, that even for abrasive grain having a submicrometer, faceted microstructure, sintering can be conducted above 1350° C.

To limit grain growth and achieve greater hardness, abrasive grain having a submicrometer, faceted microstructure generally is prepared by sintering for a relatively short period of time (e.g., several seconds to less than 30 minutes). Typically, the higher the sintering temperature, the shorter the required sintering time. Typically, the sintering time is less than about 10 minutes.

Alpha alumina seeds are known to enhance the transformation of transitional alumina(s) to alpha alumina. These (isostructural) alpha alumina seeds generally have hexagonal crystal structures which provide epitaxial growth sites.

With regard to the present invention, the presence of manganese material in the transitional alumina precursor, which is ultimately converted into alpha alumina, is observed to lower the alpha phase transformation temperature and to provide submicrometer, faceted alpha alumina microstructure. It is theorized that manganese oxide does not nucleate the transformation of the transitional alumina in the same manner as known alpha alumina seed. For alpha alumina seeds, transitional alumina(s) grow epitaxially off of the alpha alumina seeds to form a hexagonal, submicrometer, faceted alpha alumina microstructure. Hexagonal $Mn_2O_3$, however, decomposes at about 350° C., primarily to a cubic phase (although other non-hexagonal phases may be present). It is expected that by the time the manganese oxide material has reached the temperatures for transformation of transitional alumina(s), all the hexagonal $Mn_2O_3$ has decomposed to a cubic or other non-hexagonal phase. Thus, it is not expected that the presence of manganese oxide acts as an isostructural seed for the transitional alumina to alpha alumina transformation. Nevertheless, providing manganese material in the alpha alumina-based ceramic abrasive grain precursor has been observed to facilitate transformation, which results in a submicrometer, faceted microstructure.

Although not wanting to be bound by any particular theory, one possible explanation as to how the presence of manganese oxide aids in providing an alpha alumina submicrometer, faceted microstructure is that a cubic manganese oxide phase (or another non-hexagonal manganese oxide phase) includes some planes that are similar to planes in a hexagonal lattice, and thus act as nucleation sites.

Another possible explanation is that prior to the formation of the alpha alumina phase, manganese oxide and a cubic form of alumina are present in solid solution. At some point during sintering, the cubic alumina phase becomes less stable than the alpha phase, resulting in conversion of the alumina to alpha alumina.

The stoichiometry of the aluminum oxide, manganese oxide, and secondary component(s) strongly influences the particular microstructure formed. For example, if the secondary component is zirconium oxide, and the amount of manganese oxide relative to zirconium oxide is such that the ratio of manganese ion to zirconium ion is significantly greater than 1 (i.e., manganese predominates), then a submicrometer, faceted microstructure generally forms. If, however, the ratio of manganese ions to zirconium ions is significantly less than 1 (i.e., zirconium predominates), then a cellular microstructure typically forms.

Similarly, if the secondary component is a rare earth oxide selected from the group consisting of lanthanum oxide, neodymium oxide, cerium oxide, praseodymium oxide, samarium oxide, gadolinium oxide, erbium oxide, ytterbium oxide, dysprosium oxide, and mixtures thereof, and an excess of manganese oxide (i.e., more manganese oxide than is taken up by reactions with the rare earth oxide), a submicrometer, faceted microstructure may form. If, however, the rare earth oxide predominates, a cellular structure generally results.

Further, the firing conditions have a role in determining whether a ceramic body has a dense, submicrometer, faceted microstructure. At high temperatures (i.e., greater than about 1400° C.) and long firing times (i.e., greater than about 30 minutes) the crystallite size grows. At low firing temperatures (i.e., between 1300 to about 1350° C.) and short firing times (i.e., less than about 30 minutes, usually less than 10 minutes) there is less growth in the crystallite size.

From the above discussions, it will be apparent that variations in the relative amounts of manganese oxide and other components present in the abrasive grain precursor, and variations in the sintering conditions, can be utilized to obtain abrasive grain having different microstructures, and, thus, abrasive grain having different density, hardness, toughness, or performance. The following guidelines summarize the more relevant principles and observations. All weight percents are given on a theoretical oxide basis, without regard to phases present.

1. The presence of an effective amount of manganese material in an alpha alumina-based ceramic abrasive grain precursor, in the absence of rare earth material, zirconium material (i.e., zirconium oxide and/or precursor thereof), or yttrium material (i.e., yttrium oxide and/or precursor thereof), tends to reduce the transformation temperature of the transitional alumina(s) to alpha alumina. This effect is readily observed and achieved with the presence of about 0.1 to about 25% by weight manganese oxide (calculated on a theoretical oxide basis as MnO, based on the total weight of the alpha alumina-based ceramic abrasive grain).

2. In the absence of more than very minor amounts of the secondary components, sintered abrasive grain comprising alpha alumina and manganese oxide typically have a vermicular microstructure.

3. In an alpha alumina-based abrasive grain precursor comprising alpha alumina precursor, manganese material, and rare earth material selected from the group consisting of lanthanum oxide, neodymium oxide, cerium oxide, praseodymium oxide, samarium oxide, gadolinium oxide, europium oxide, erbium oxide, ytterbium oxide, dysprosium oxide, precursors thereof, and mixtures thereof, a significant stoichiometric excess of manganese oxide is associated with the generation of a submicrometer, faceted microstructure in the sintered alpha alumina-based ceramic. A preferred abrasive grain comprises by weight, on a theoretical oxide basis, at least 0.1% manganese oxide, preferably 0.1 to about 25% manganese oxide (calculated on a theoretical oxide basis as MnO, based on the total weight of the alpha alumina-based ceramic abrasive grain). The term "stoichiometric excess" is meant to refer to an amount of manganese oxide significantly greater than an amount that would be used in forming crystalline structures (e.g., magnetoplumbite ($MnLnAl_{11}O_{19}$)) with the rare earth oxide.

4. Alpha alumina-based abrasive grain precursor comprising alpha alumina precursor, zirconium material, and manganese material, a stoichiometric excess amount by weight manganese oxide (calculated as MnO) relative to zirconium oxide (calculated as $ZrO_2$) is associated with the formation of sintered alpha alumina ceramic having a submicrometer, faceted microstructure. If the abrasive grain consists essentially of alpha alumina, at least 0.1% by weight zirconium oxide (calculated on a theoretical oxide basis as $ZrO_2$, based on the total weight of the alpha alumina-based ceramic abrasive grain), and at least 0.1% by weight manganese oxide (calculated on a theoretical oxide basis as MnO, based on the total weight of the alpha alumina-based ceramic abrasive grain), with a stoichiometric excess of manganese oxide to zirconium oxide, a relatively hard, dense abrasive grain results. Preferred abrasive grain contains about 1 to about 10% by weight zirconium oxide.

5. A stoichiometric excess of manganese oxide relative to rare earth oxide in an abrasive grain precursor may be utilized to generate a reduction in sintering temperature during preparation of the abrasive grain. The term "stoichiometric excess" in this context is meant to refer to an amount of manganese oxide sufficiently greater than the stoichiometric amount which would be used up in reaction with any rare earth oxide present to form magnetoplumbite (represented by the general formula $MnLnAl_{11}O_{19}$).

Preparation of Abrasive Grain According to the Present Invention

The Base Grits

The base grits are generally made by preparing a dispersion of alumina hydrate, which is dried to provide base grit material. The dried dispersion can be crushed to produce particles. Alternatively, the dispersion can be only partially dried, shaped, and then further dried to provide base grit material. The base grit material is converted to abrasive grain by sintering. Optionally, the base grits can be classified and/or modified prior to sintering.

The base grit material can be initially formed (e.g., from a dispersion) with manganese material included therein, and/or the base grit material can be modified after its initial formation to incorporate such materials therein.

Preferred base grit material, for utilization as particles in processes according to the present invention, are prepared according to modifications of known sol-gel processes. Such processes, for example, are disclosed in U.S. Pat. Nos. 5,011,508 (Wald et al.), 4,744,802 (Schwabel), 4,574,003 (Gerk), 4,518,397 (Leitheiser et al.), the disclosures of which are incorporated herein by reference, and U.S. Pat. No. 4,623,364 (Cottringer). Modifications to the processes in order to achieve the improved product of the present invention are indicated herein.

Preparation of the alumina base grits by a sol-gel process typically involves first preparing a dispersion comprising from about 2 to about 60% by weight alpha aluminum oxide monohydrate (typically boehmite), although other hydrates may be used. The weight percent is based on a total of hydrate plus liquid carrier, without regard to adjuvants or additives. The boehmite can be prepared from various conventional techniques or it can be acquired commercially. Suitable boehmite is commercially available, for example, under the trade designation "DISPERAL" from Condea Chemie, GmbH of Hamburg, Germany, and "CATAPAL" from Vista Chemical Co., Houston, Tex. These aluminum oxide monohydrates are in alpha form, are relatively pure (including relatively little, if any, hydrate phases other than monohydrate), and have high surface area.

Although the liquid carrier may be a non-polar organic carrier (e.g., heptane or hexane), the liquid carrier is typically water, preferably deionized water. Generally the dispersion (with respect to all components) contains at least 10% by weight liquid carrier, preferably between about 30 and about 80% by weight liquid carrier.

A peptizing agent may be used in the boehmite dispersion to produce a more stable hydrosol or colloidal dispersion. Monoprotic acids which may be used as the peptizing agent include acetic, hydrochloric, formic, and nitric acids. Nitric acid is the preferred peptizing agent. Multiprotic acids are generally avoided because they tend to rapidly gel the dispersion, making it difficult to handle or to mix in additional components. Some commercial sources of boehmite contain an acid titer (e.g., acetic, formic, or nitric acid) to assist in forming a stable dispersion.

The dispersion may contain a nucleating material in an amount effective to enhance the transformation to alpha alumina. The term "nucleating material" as used herein refers to a nucleating agent or precursor thereof. Suitable nucleating materials include fine particles of alpha alumina, alpha ferric oxide or its precursor, titanates or their precursors, chromium oxide or its precursor, and other materials which can nucleate the transformation of the base grits during sintering. Nucleating such dispersions is disclosed, for example, in U.S. Pat. Nos. 4,774,802 (Schwabel), and 4,964,883 (Morris et al.), the disclosures of which are incorporated herein by reference for their teachings of nucleation, and U.S. Pat. No. 4,623,364 (Cottringer), and copending application having U.S. Ser. No. 07/552,489, filed Jul. 16, 1990, now U.S. Pat. No. 5,219,806.

Preferably, sufficient nucleating material is provided into the abrasive grain precursor by introduction into the dispersion and/or impregnated into the abrasive grain precursor to provide in the range from about 0.01 to about 20 percent by weight nucleating agent.

The pH of the dispersion effects how fast the dispersion will thicken or gel. Typically, the pH should be in the range of about 1.5 to about 4. In general, the lower the pH, the higher the rate of gelation. The addition of a modifier precursor, discussed below in the section entitled "Incorporation of Manganese Material and Other Materials into the Base Grits," will generally result in gelation of the dispersion.

Shaping of the gel, which is optional, may be accomplished by conventional means such as pressing, molding, coating, extrusion, cutting, or some combination of those steps, with drying. It may be done in steps, for example, by first forming a plastic mass of the partially dried dispersion through extrusion. The resulting plastic mass is shaped by any convenient method, such as pressing, molding, or extrusion, and then dried to produce the desired shape, for example, a rod, pyramid, disk, diamond, cone, or similar shape. Irregularly-shaped abrasive grain products are conveniently formed by depositing the dispersion in any convenient size and shape of drying vessel (e.g., a pan-shaped vessel) and drying, typically at a temperature below the frothing temperature of the dispersion.

Whether shaped or not, the dispersion or gelled dispersion is generally dried (e.g., dewatered) to a solid. Conventional means may be utilized to dry the dispersion. Air drying steps may be used, as well as various dewatering methods. Drying can be accomplished, for example, in a forced air oven at a temperature in the range of about 50° C. to about 200° C., preferably between about 75° C. and about 125° C. Generally, the gelled dispersion is heated slowly during drying to inhibit frothing.

After the dispersion is dry, it may be crushed or shaped through any suitable means. Examples of crushing techniques include use of a hammer mill, ball mill, or roll crusher. Any method of comminuting the solid can be used, and the term "crushing" is meant to refer to any such method. In general, a wide variety of particle sizes, i.e., about 10 to about 4000 micrometers, may be used as base grits. Generally, a selected size range is isolated for any given use. Classification steps such as screening, may be used to obtain selected particle sizes or size fractions. It is noted that sintering, or calcining and sintering, generally leads to particle shrinkage on the order of about 33% of linear dimension. This should be taken into consideration during fraction selection.

The crushed or shaped material may, in some instances, comprise the base grits or base grit material. In other instances, the crushed or shaped material will comprise a "grit precursor," the base grit material being formed by calcining the material or providing other modifications thereto. In typical applications, it will be preferred to calcine the base grit material to remove water or other volatiles. If the grits are formed using a non-polar organic solvent as the liquid carrier, a calcining step is typically not needed.

During calcining, essentially all of the volatiles are removed from the grit precursor. Also, any modifier precursors that were present in the dispersion and which are now retained within the grit precursor are transformed to a metal oxide during the calcining process. During calcining, the base grits are generally heated to a temperature between about 400° C. and about 1000° C., preferably about 400° C. to about 800° C. The base grits are held within this temperature range until the free water, and preferably over about 90 wt-% of any bound volatiles, are removed. Further, if the grit precursor contains a modifier precursor, the base grits are preferably calcined for a period of time sufficient to achieve essentially complete conversion of the modifier precursor to oxide. The resulting calcined base grits are porous particles.

Incorporation of Manganese Material and Other Materials into the Base Grits

According to the present invention, the base grits are modified to advantage by the inclusion therein of manganese material, and, optionally, secondary component material(s). The step of modification with respect to manganese can be conducted either during base grit formation and/or following base grit formation.

In general, it is desirable to incorporate an effective amount of manganese oxide to achieve improvement in the sintered abrasive grain and/or formation thereof. Improvement in abrasive grain is generally measured by comparison of the density, hardness, toughness, or performance of material made with incorporation of the added material (e.g., manganese oxide) to material having the same formulation but without the added material. Alternately, the improvement may be measured by comparison of the process conducted with and without the added material (e.g., manganese oxide) being present. Further, the improvement can be exemplified by a reduction in the transitional to alpha alumina transformation temperature.

In typical applications, improvement will be found if the base grit material is provided with sufficient amounts of the components so that the final (sintered) ceramic abrasive grain comprises by weight about 70 to about 98% aluminum oxide, preferably about 87 to about 94% (calculated on a theoretical oxide basis as $Al_2O_3$, based on the total weight of the alpha alumina-based ceramic abrasive grain), and about 0.1 to about 25% manganese oxide (calculated on a theoretical oxide basis as MnO, based on the total weight of the alpha alumina-based ceramic abrasive grain). Preferably, the abrasive grain comprises by weight about 1 to about 15% by weight manganese oxide, more preferably about 2 to about 10% manganese oxide, and most preferably about 3 to about 8% manganese oxide.

When it is said that the abrasive grain includes various materials by weight percent, reference is meant to the final sintered ceramic abrasive grain, and the weight percent is stated on a theoretical oxide basis, without regard to the phases present and without regard to the presence of any coating on the grain. Thus, should the abrasive grain be coated, the weight percent should be based upon or calculated based upon the grain (i.e., the sintered core) minus the weight of the coating.

Abrasive grain according to the present invention may be formulated to comprise secondary component(s) such as those materials selected from the group consisting of yttrium oxide, zirconium oxide, hafnium oxide, lanthanum oxide, neodymium oxide, cerium oxide, praseodymium oxide, samarium oxide, gadolinium oxide, erbium oxide, ytterbium oxide, dysprosium oxide, and mixtures thereof. Further, abrasive grain according to the present invention may be formulated to comprise oxide modifiers such as those materials selected from the group consisting of cobalt oxide, nickel oxide, zinc oxide, iron oxide, silicon oxide, titanium oxide, magnesium oxide, and combinations thereof. Such materials typically alter the chemical and physical properties of the sintered abrasive grain or aid in increasing the effectiveness of a subsequent processing step. Generally, the addition of these materials increases the percent of theoretical density of the sintered abrasive grain. In some instances, some of these materials, however, may increase the transitional to alpha alumina transformation temperature, thereby counterbalancing or partially counterbalancing the transformation temperature effect of manganese oxide on decreasing the transformation temperature.

A variety of methods may be utilized to introduce the various non-alumina components into the base grits. While any of the methods disclosed generally result in improved base grits, variations in the methods used will lead to variations in the characteristics of the final sintered product.

With respect to manganese material introduction, in general, the manganese may be introduced by adding manganese oxide directly (or a precursor such as a manganese nitrate salt) into the dispersion of aluminum oxide monohydrate during the base grit formation and/or introducing manganese oxide precursor (e.g., manganese salt) into the base grits after their formation (typically after calcining of the base grits) through impregnation. Preferably, manganese material is introduced by a manganese salt impregnation of base grit material. Impregnation is preferred because greater uniformity of distribution of the manganese material through the base grit material typically results. If introduced in the dispersion, salt migration during gel formation and drying may inhibit uniform distribution.

In general, other oxides (if used) are introduced into the base grits by either or both of the processes described for manganese oxide (or precursor) (i.e., either through introduction of these materials (or precursors of those materials (e.g., salts) into the dispersion during the sol gel process and/or impregnation of already formed base grits with the appropriate precursors (e.g., salts)). Typically, these materials are preferably introduced by impregnation of the base grit material for reasons analogous to those mentioned above. However, if zirconium salt is introduced, it may be preferable to introduce it during the sol gel process, because zirconium salts do not readily impregnate base grit material.

Introduction of oxide precursors into the sol gel is merely a matter of mixing an appropriate oxide precursor (e.g., metal salt) into the dispersion. The manganese oxide precursor may be, for example, a manganese alkylate, typically manganese formate or manganese acetate, or it may be a nitrate. Such salts are water soluble, and, thus, can be readily mixed into the dispersion in the sol gel process, provided the liquid carrier is water, preferably, deionized water.

Rare earth oxide precursors and yttria precursors may be the appropriate metal salt of a volatile anion, for example, nitrates, formates, and acetates. The most readily available chemical forms of rare earths and yttrium are typically the oxides, which are converted to the salts (modifier precursors) by reaction with an excess of concentrated nitric acid to produce a nitrate solution. The nitrate solution can be readily introduced into the dispersion of the sol-gel process through mixing. Similar processes can be used, for example, to provide the dispersion of the sol-gel process, and, thus, the base grits ultimately formed with zinc oxide, magnesium oxide, cobalt oxide, chromium oxide, hafnium oxide, nickel oxide, titanium oxide, precursors thereof, and mixtures thereof therein. These modifiers and their uses in abrasive grains are further described in, for example, U.S. Pat. Nos. 4,518,397 (Leitheiser et al.), 4,770,671 (Monroe et al.), and 4,881,951 (Wood et al.), the disclosures each of which are incorporated herein by reference.

If it is desired that the sintered abrasive grain include zirconium oxide and/or cerium oxide therein, a preferred method for introducing zirconium oxide and/or cerium oxide is by adding zirconia and/or ceria dispersion to the original alpha alumina oxide monohydrate dispersion prior to gelation. These materials may be added to the dispersion as a sol or as a fine powder. For additional details, see copending applications having Ser. Nos. 07/951,654 and 07/951,443, each filed Sep. 25, 1992, the disclosures of which are incorporated herein by reference.

Base grits prepared according to the sol-gel process are porous, i.e., they generally have pores about 7-9 nanometers in size (diameter) extending therein from an outer surface. When mixed with a liquid carrier (preferably, deionized water) containing dissolved metal salt therein, the metal salt can impregnate the pores through capillary action. When dried and calcined, the impregnate (metal oxide precursors) will be converted to the metal oxides.

In general, all that is required for introduction of metal oxide precursor through the impregnation process is a mixing of an appropriate amount of carrier liquid with the base grits. Generally, enough liquid carrier should be used to give substantial saturation (at least 70% saturation) of the grits. When the base grits are prepared according to the sol-gel process described above, wherein the base grits are derived from an aqueous dispersion of "DISPERAL" boehmite, about 50 ml or more of liquid carrier with impregnate dissolved therein should be mixed with each 100 grams of base grits. If the ratio is within the 50 to 60 ml per 100 gram range, in general all of the dissolved oxide precursor will impregnate the base grits (i.e., excess solution is preferably avoided). From the above descriptions it will be understood that when impregnation is used, the modifier precursor will be preferentially partitioned toward outer parts of the abrasive grain. Introduction of various materials including nucleating material into base grits by an impregnation process is generally described in U.S. Pat. No. 5,164,348 (Wood), the disclosure of which is incorporated herein by reference. For further details for incorporating nucleating material by impregnation see, for example, U.S. Ser. No. 5,139,978 (Wood).

For impregnation of dried gel, the liquid medium should be selected such that the dried gel is not dissolved by it. For example, a dried gel derived from an aqueous gel will dissolve in water. A suitable liquid medium for an impregnating solution for a dried gel derived from an aqueous gel may be a non-polar solvent. Alternatively, when a dried gel is calcined, the liquid medium for impregnation can be water (preferably, deionized water).

Abrasive grain according to the present invention may further comprise a surface coating (i.e., a coating covering the sintered core). Typically, the coating will comprise metal (or semimetallic) oxide, most typically zirconia, silica or alumina (e.g., alpha alumina, transitional alumina, or hydrated alumina). Any of a variety of coating methods may be utilized, including the ones described in U.S. Pat. Nos. 5,011,508 (Wald et al.), 1,910,440 (Nicholson), 3,041,156 (Rowse), 5,009,675 (Kunz et al.), 4,997,461 (Markhoff-Matheny et al.), and 5,042,991 (Kunz et al.). The preparation of the coating may include the use of nucleating material. In some instances, a preferred coating, not described in the above-cited references, may be applied to the base grits by addition of a dispersion or suspension carrying inorganic particulates (typically metal oxides) therein to the base grits. A coating formed from inorganic particulates in this manner is described in Assignee's copending U.S. Application Ser. No. 07/920,728, now U.S. Pat. No. 5,213,591, incorporated herein by reference. An alternative coating formed from metal alkoxides is described in Assignee's copending U.S. Application Ser. No. 07/920,834, incorporated herein by reference.

Abrasive grain according to the present invention may include calcium oxide and/or strontium oxide. For details regarding the inclusion of these oxides, see copending application, U.S. Ser. No. 07/989,760, filed Dec. 14, 1992.

The principal step of converting the base grit to abrasive grain is the sintering of the base grit (i.e., uncalcined dried gel) or grit precursor (i.e., calcined dried gel) to form the ceramic alpha alumina, manganese-containing abrasive grain. Modifiers, nucleating materials and/or coatings may be added to the base grits.

Sintering of the grains may be accomplished through a variety of conventional processes. Typically the sintering will be conducted at a temperature between about 1200° C. and 1650° C., for a time sufficient to complete the conversion of the precursor to the abrasive grain. Generally the sintering step comprises the conversion of the alpha alumina precursor (e.g., transitional alumina(s)) to alpha alumina or alpha alumina and reaction product(s) of aluminum oxide and manganese oxide (and metal oxide modifier(s), if present). Although the length of time to which the treated base grits should be exposed to sintering temperatures may be varied depending upon factors such as the precise composition of the grit, generally sintering can be accomplished within a time period of a few seconds to about 120 minutes. Sintering of various base types of base grit is described in general in U.S. Pat. No. 4,314,827 (Leitheiser et al.), incorporated herein by reference. The techniques of sintering described in that reference may be applied to grit prepared according to the present invention.

The Resulting Abrasive Grain

Figure 4:
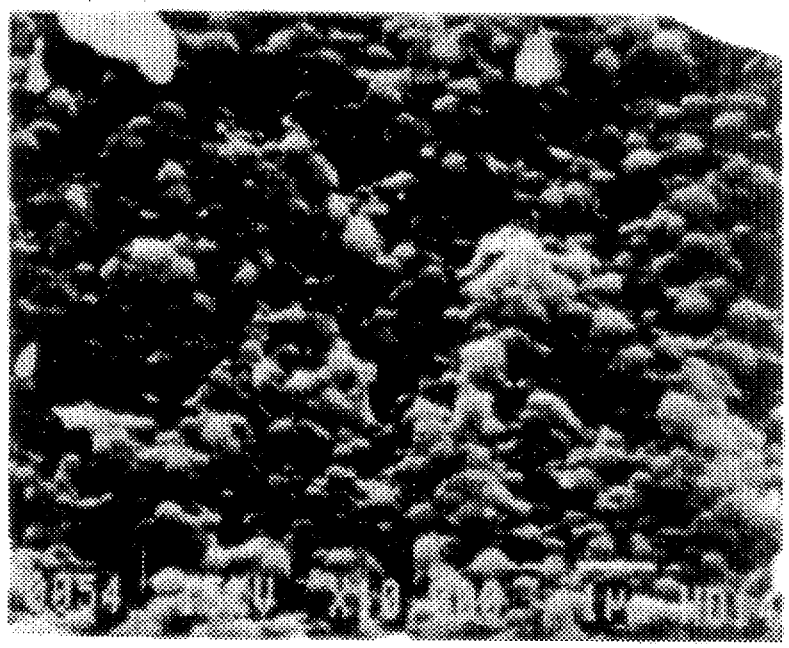
FIG. 4 is a scanning electron photomicrograph of the abrasive grain of Example 15 taken at 10,000×.

FIG. 4 is a scanning electron photomicrograph of a fracture surface of the abrasive grain of Example 15 which had been thermally etched at 1250° C. for 15 minutes. This example had a submicrometer, faceted microstructure, although the faceted feature does not appear in the thermally etched sample. The abrasive grain comprised, by weight, 92.8% aluminum oxide, 2.7% lanthanum oxide, and 4.5% manganese oxide (calculated on a theoretical oxide basis as $Al_2O_3$, $La_2O_3$, and MnO, respectively, based on the total weight of the alpha alumina-based ceramic abrasive grain). The alpha alumina crystallites were faceted and generally each had a size less than one micrometer, typically in the range of 0.2 to 0.5 micrometer. This abrasive grain had an average hardness of 22.3 GPa and a density of 3.98 g/cm$^3$.

Figure 5:
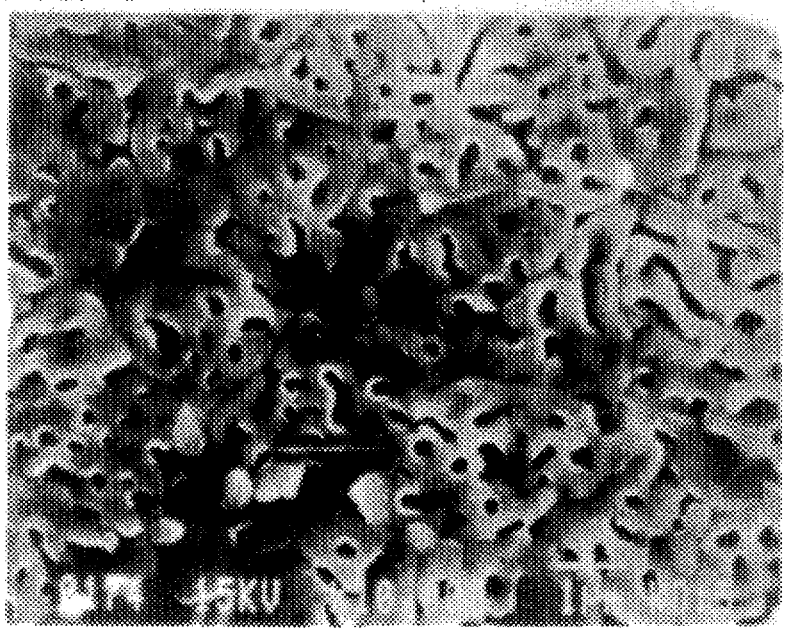
FIG. 5 is a scanning electron photomicrograph of an abrasive grain of according to the present invention taken at 10,000×.

In FIG. 5, an abrasive grain prepared according to the process of General Procedure II (below) is depicted. The abrasive grain of FIG. 5 had a polished surface to a one micrometer finish and a thermal etch of 1250° C. for 15 minutes. The abrasive grain comprised, by weight, 96.8% aluminum oxide, 0.2% lanthanum oxide, and 3% manganese oxide. The sample had a vermicular microstructure. The microstructure appeared to be a combination of dense regions and open regions, the dense regions being connected to the dense regions by bridges. In this microstructure, the manganese was distributed nearly uniformly throughout.

Figure 6:
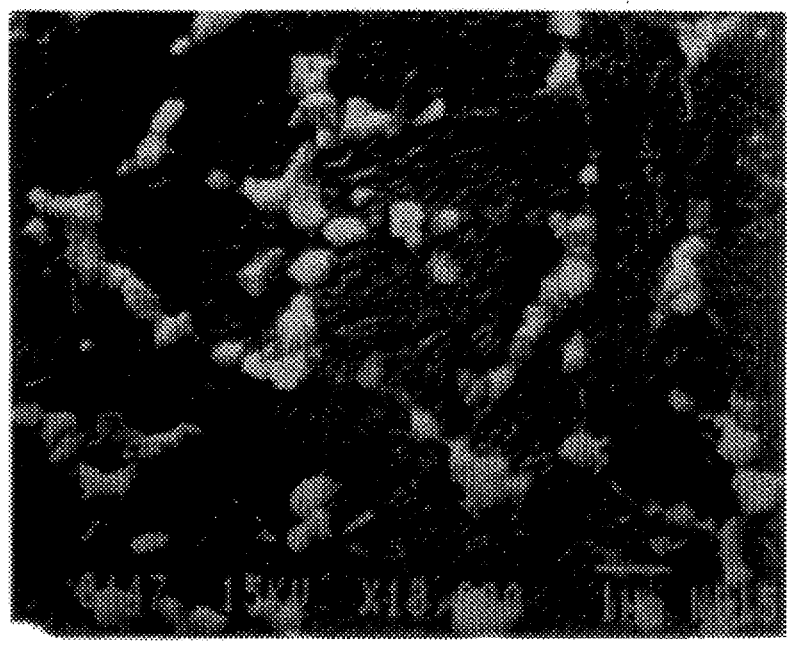
FIG. 6 is a scanning electron photomicrograph of an abrasive grain according to the present invention taken at 10,000×.

In FIG. 6, an abrasive grain prepared according to the process of General Procedure II (below) is depicted. The abrasive grain of FIG. 6 was a polished surface to a one micrometer finish with a thermal etch of 1250° C. for 15 minutes. The abrasive grain comprised, by weight, 91.2% aluminum oxide, 3% lanthanum oxide, and 5.8% manganese oxide. The sample had a cellular microstructure. The microstructure consisted of cells which was a collection of submicrometer alpha alumina crystallites. The alpha alumina crystallites are believed to be oriented in the cell and to have low angle grain boundaries between crystallites within a given cell, and high angle grain boundaries between crystallites of adjacent cells. The alpha alumina crystallites were between about 0.1 to 0.4 micrometer in diameter, whereas the cell size was between about 2 to about 5 micrometers in diameter. Distributed between and within the cells were platelets which are believed to be made of hexagonal rare earth aluminate reaction product. These platelets are between 0.5 to 1 micrometer in diameter and are about 0.05 micrometer in thickness. It is theorized that these platelets reinforce the alumina cells, thereby increasing the toughness which results in an improved abrasive grain. Also present were submicrometer particles of spinel which tended to be concentrated between cells.

Figure 7:
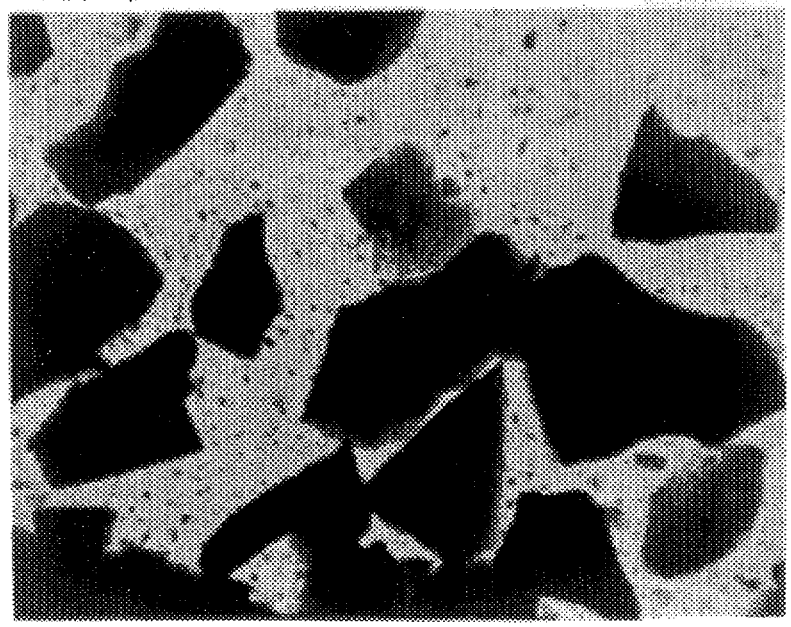
FIG. 7 is an optical microscope photomicrograph of the abrasive grain of Example 26 taken at 160×.

The abrasive grain depicted in FIG. 7 was prepared according to Example 26. It comprised 93% aluminum oxide, 6% manganese oxide, and 1% neodymium oxide. The sample was immersed in a fluid that had a 1.760 index of refraction and was examined under an optical microscope with cross polarizers at 160×. No cells were present. This sample represented a submicrometer, faceted microstructure.

Figure 8:
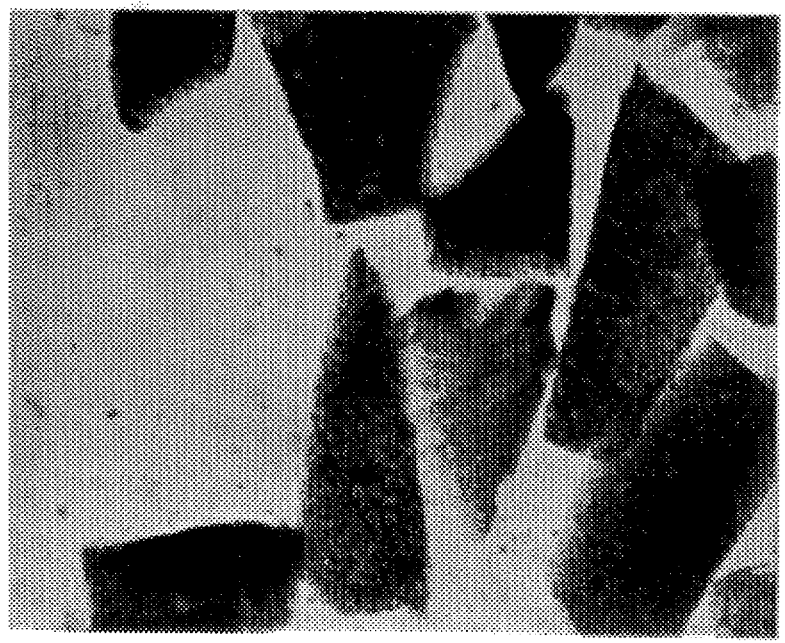
FIG. 8 is an optical microscope photomicrograph of the abrasive grain of Example 27 taken at 160×.

The sample depicted in FIG. 8 was prepared according to Example 27. It comprised 94.7% aluminum oxide, 0.5% manganese oxide, and 4.8% neodymium oxide. The sample was immersed in a fluid that had a 1.760 index of refraction and examined under an optical microscope with cross polarizers at 160×. The sample represents a cellular microstructure. When the sample was rotated, the cells within the abrasive grain either winked in and out of extinction or the cells changed color.

Figure 9:
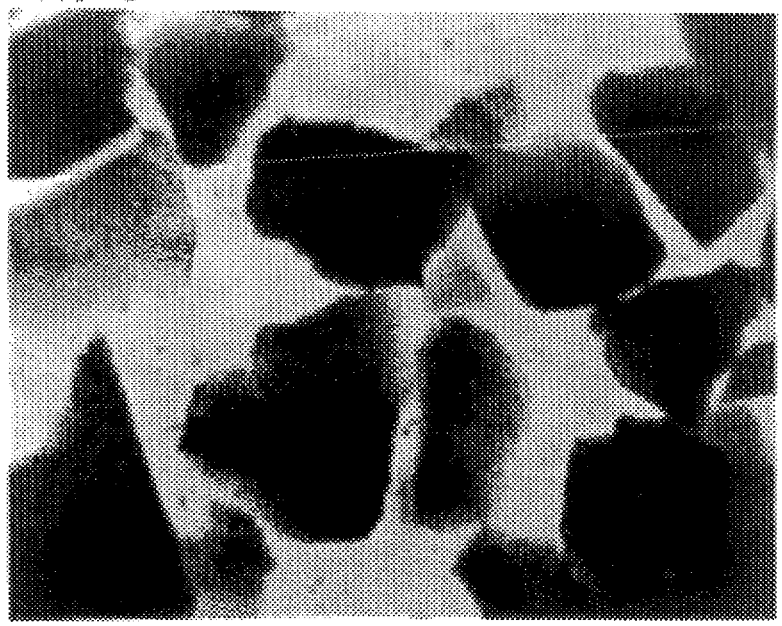
FIG. 9 is an optical microscope photomicrograph of the abrasive grain of Example 28 taken at 160×.

The abrasive illustrated in the photomicrograph of FIG. 9 comprised 89.2% by weight aluminum oxide, 6% manganese oxide, and 4.8% neodymium oxide. It was prepared according to Example 28. The sample was immersed in a fluid that had a 1.760 index of refraction and was examined under an optical microscope with cross polarizers at 160×. The sample represents a mixed microstructure. Some abrasive grain of this sample were observed to be without cells, while others were observed to have cells which changed color on rotation of the optical microscope stage. Still other abrasive grain of this sample were observed to contain both regions with cells and regions without cells.

Figure 10:
FIG. 10 is a scanning electron photomicrograph of an abrasive grain (Comparative Example L) comprising 98% by weight aluminum oxide and 2% by weight zirconium oxide (calculated on a theoretical oxide basis as $Al_2O_3$ and $ZrO_2$, respectively), taken at 10,000×.

The photomicrographs of FIGS. 10–13 are fractured surfaces with no thermal etch. These photomicrographs show a progression from a porous microstructure to a cellular microstructure to a submicrometer, faceted microstructure. The cellular feature of the microstructures was characterized by optical microscopy. The sample of FIG. 10 (Comparative Example L) contained 98% aluminum oxide and 2% zirconium oxide and had a cellular microstructure. The photomicrograph of FIG. 10 depicts a relatively porous (vermicular) material. The sample of FIG. 11 (Example 56) contained 97% aluminum oxide, 2% zirconium oxide, and 1% manganese oxide and had a cellular microstructure. This photomicrograph shows cells approximately 5 to 10 micrometers in size. The sample shown in FIG. 12 (Example 57) contained 96% aluminum oxide, 2% zirconium oxide, and 2% manganese oxide and had a mixed microstructure of cellular and submicrometer, faceted regions. The photomicrograph shows a cellular region having cells about 5 to 10 micrometers in size. The sample depicted in FIG. 13 (Example 58) contained 93% aluminum oxide, 2% zirconium oxide, and 5% manganese oxide and had a submicrometer, faceted microstructure. The alpha alumina crystallites are faceted and their particle size is less than one micrometer. In this submicrometer, faceted microstructure there is no evidence of cells.

The density of abrasive grain according to the present invention typically is about 85 percent or more of theoretical density, preferably about 90 percent or more, and more preferably, about 95 percent or more.

Abrasive Products

The present invention includes within its scope the provision of abrasive products including abrasive grain as described herein.

One type of abrasive product according to the present invention is a coated abrasive which comprises a backing (substrate) with abrasive grains, as described herein, adhered thereto by binder. The backing may be cloth, polymeric film, fiber, nonwoven web, paper, combinations thereof, or treated versions thereof. A variety of inorganic or organic binders could be utilized. The abrasive grains may be applied in one layer or a plurality of layers. Preferred methods of making coated abrasives are described in U.S. Pat. Nos. 4,734,104 (Broberg) and 4,737,163 (Larkey), the disclosures of which are incorporated herein by reference.

An example of a coated abrasive product is provided in FIG. 1 at reference numeral 1. Referring thereto, backing (substrate) 2 has abrasive layer 3 comprising abrasive grain 4 secured to a major surface of backing 2 by make coat 5 and size coat 6. In some instances a supersize coat, not shown, may be used.

Figure 2:
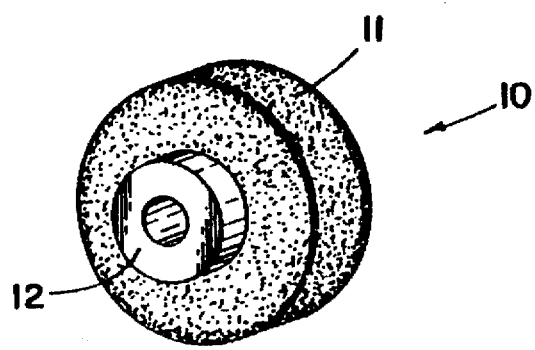
FIG. 2 is a perspective view of a bonded abrasive article having abrasive grain according to the present invention incorporated therein.

Bonded abrasive products (e.g., grinding wheels and cutoff wheels) according to the present invention generally comprise shaped masses of abrasive grain, described herein, held together by a binder. Conventional binders for grinding wheels include organic, metallic, or vitrified binder. In FIG. 2, grinding wheel 10 is depicted comprising abrasive grain 11 molded in a wheel and mounted on hub 12. For additional details in the preparation of grinding wheels see, for example, U.S. Pat. No. 4,997,461 (Markhoff-Matheny et al.), the disclosure of which is incorporated herein by reference. Cutoff wheels can be made using conventional techniques known in the art. Binders for cutoff wheels include organic binders.

Figure 3:
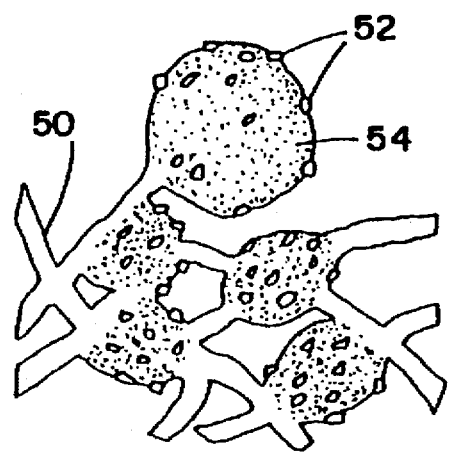
FIG. 3 is an enlarged, fragmentary, schematic view of a nonwoven abrasive product having abrasive grain according to the present invention incorporated therein.

Nonwoven abrasive products incorporating abrasive grains according to the present invention typically comprise an open porous lofty polymer filament structure having the abrasive grains of the invention distributed throughout the fiber structure and bonded therein by an organic binder. Typical fibrous filament structures usable with such constructions comprise polyamides, polyesters and polypropylenes. In FIG. 3, a schematic depiction, enlarged about 100×, of a typical nonwoven abrasive article is provided. The article comprises fibrous mat 50 as a substrate onto which abrasive grain 52 are adhered by binder 54. For additional details in the preparation of nonwoven abrasive products see, for example, U.S. Pat. No. 2,958,593 (Hoover et al.), the disclosure of which is incorporated herein by reference.

As indicated generally above, abrasive products according to the present invention generally comprise binder and abrasive grains or particles therein. A wide variety of binders may be utilized in abrasive products according to the present invention, including conventional ones. Useful organic binders include phenolic, urea-formaldehyde, melamine-formaldehyde, polyester resins, glue, aminoplast resins, epoxy resins, acrylate resins, urethane resins and combinations thereof. The binder may include inorganic particulates such as grinding aids or fillers. Examples of such grinding aids include cryolite, ammonium cryolite, potassium tetrafluoroborate, polyvinyl chloride, sulfur and sodium chloride. Examples of fillers include calcium carbonate, silica and calcium metasilicate.

Abrasive products or articles according to the present invention may contain, as particulate material therein, 100% abrasive grain which have been prepared or improved according to the descriptions herein. In addition, or alternatively, abrasive articles may contain a blend of abrasive grain according to the present invention with conventional abrasive grain or diluent grain. Conventional abrasive grain usable in this fashion include fused aluminum oxide, silicon carbide, garnet, fused alumina, diamond, cubic boron nitride, fused alumina-zirconia, and other sol-gel abrasive grain (see, e.g., U.S. Pat. Nos. 4,744,802 (Schwabel), 4,623,364 (Cottringer), 4,574,003 (Gerk), 5,011,508 (Wald et al.), 4,518,397 (Leitheiser et al.), and 4,314,827 (Leitheiser), the disclosures of which are incorporated herein by reference). Diluent grain include marble, gypsum, and glass. Abrasive grain according to the present invention may be combined with abrasive agglomerates (see, e.g., U.S. Pat. No. 4,799,939 (Bloecher et al.)).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

For all of the Examples, the abrasive grains were made according to one of the Procedures outlined below. All weight figures given herein for abrasive grains are on an elemental oxide basis without regard to phases present. All references to amounts of materials by the term "parts" refer to "parts by weight." After the abrasive grains were made, they were incorporated into a coated abrasive fibre disc which were made according to the described procedure. The resulting coated abrasive discs were tested according to a Test Procedure described below. The experimental error in the tests was about +/−5%. In some instances the grinding performance was measured as a relative performance against a comparative example.

In some instances, the density, hardness or toughness were measured for the abrasive grains. The hardness was measured using the general procedures of ASTM Test Method E384 ("Test Method For Microhardness of Materials," 1991 *Annual Books of ASTM Standards*, Sec. 3, vol. 3.01, pp. 463–68). The toughness was measured using the general procedures described in "Equilibrium Penny-Like Cracks in Indentation Fracture," *J. Mat. Sci.*, 10, 1974, pp. 2016–24. The Vickers microhardness of the abrasive grain were measured using a conventional microhardness tester with a diamond indenter (commercially available under the trade designation "MINILOAD 2 MICROHARDNESS TESTER" from Leitz of Germany). Mounted abrasive grain samples were polished using conventional techniques to provide a 1 micrometer polished surface. The indenter (a highly polished pointed square pyramidal diamond with a face angle of 136 degrees) was brought into contact gradually and smoothly with the sample to be measured. The predetermined load was 500 grams. Reported values were an average of at least 5 measurements.

The toughness measurement was made using the same instrument as described above for the Vickers microhardness measurement, wherein a predetermined load was applied to the sample to be tested causing cracks to generate at the apex of the diamond shape impression of the indenter. The toughness would be determined using the following equation:

$$\text{Toughness, } K_i = \frac{F_N}{((\text{pi})c)^{3/2} (\tan \beta)},$$

wherein c is the crack radius, $F_N$ is the indentor load, and β is the semi-apical angle of the indenter (68 degrees for a Vickers diamond). Reported values are an average of at least 5 measurements.

The densities were determined using a Micromeritics (Norcross, Ga.) AccuPyc 1330 helium pycnometer.

The surface and internal porosity of selected abrasive grain was assessed based on the penetration of a red dye into the surface and internal porosity of the grain. A sample of sintered grain was placed in a flask containing a red penetrating dye (available under the trade designation "P-303A Penetrant" from Uresco Androx of Cerritos, Calif.). The grains were thoroughly mixed to ensure complete coverage with the dye. The dye was then decanted off, and the grains rinsed with deionized water several times to remove the residual dye. A red color from the dye denoted a highly porous grain, while a grain which did not exhibit the red color was deemed to have little or no surface or internal porosity.

General Procedure I for Making the Abrasive Grain

Steps A through D

STEP A The following were charged and continuously mixed into a 18.9 liter polyethylene lined steel vessel to form a dispersion: 2269 parts of room temperature deionized water, 45 parts of 16N analytical reagent grade nitric acid, and 643 parts of alpha aluminum oxide monohydrate powder (commercially available under the trade designation "DISPERAL" from Condea Chemie GMbH of Hamburg, Germany).

STEP B The resulting mixture was dispersed at high speed for 3 to 4 minutes using a Giford-Wood Homogenizer Mixer (Greeco Corp., Hudson, N.H.). The resulting sol was poured into a 46 cm by 66 cm by 5 cm polyester-lined aluminum tray and dried in a forced air oven at 100° C. for about 24 hours.

STEP C The resulting dried material was crushed using a "Braun" type UD pulverizer having a 1.1 mm gap between the steel plates to form particles. The particles were screened to provide 0.125 to 1 mm sized particles.

STEP D The screened particles were calcined at about 650° C. using a conventional rotary calciner.

Steps E and F

STEP E Next, an impregnation solution was prepared. Magnesium nitrate solution was prepared by first providing an aqueous solution having a sufficient amount of precursor to provide the solution, on a theoretical oxide basis, with 11% MgO. This solution was combined with other impregnation solutions and/or diluted with deionized water to provide the desired level of oxide in the (sintered,) ceramic abrasive grain. Similarly, lanthanum nitrate, neodymium oxide, and manganese nitrate solutions were prepared by first providing aqueous solutions having a sufficient amount of the respective nitrates to provide the respective solutions, on a theoretical oxide basis, with 28% $La_2O_3$, 28% $Nd_2O_3$, and 20% MnO, respectively. Deionized water was added to the metal nitrate salts to form 275 ml of impregnation solution. This 275 ml was then combined with about 500 grams of calcined particles from Steps A through D. The impregnation solution and the calcined particles were thoroughly mixed together to cause the solution to be impregnated into the calcined particles by capillary action.

STEP F The resulting impregnated particles were dried such that the surfaces of the impregnated particles were relatively dry to the touch and then calcined as described in Step D, above. If the surfaces of the impregnated particles are too "wet," the particles adhered to the feed tube of the calciner. For multiple impregnations, the calcined particles were allowed to cool and then they were impregnated again with the desired impregnation solution.

STEP G

Next, the calcined, impregnated particles were fed through a 1400° C. rotary kiln. The kiln included a 8.9 cm diameter, 1.3 meter long silicon carbide tube inclined at an angle of 4.4° C. to the horizontal. The kiln hot zone was about 76 cm. The tube was rotated at 6 rpm to provide a residence time in the kiln about 5 minutes unless otherwise specified. The product exited the kiln into room temperature air where it was collected in a metal container and allowed to cool to room temperature.

General Procedure II For Making the Abrasive Grain

Steps A through D

STEP A The following were dispersed (continuously mixed) together using the high shear mixer: 69.8 parts of approximately 60° C. deionized water; 2.3 parts of technical grade (70%) nitric acid; and 28.5 parts alpha aluminum oxide monohydrate powder ("DISPERAL").

STEP B The resulting sol was dried over a 24 hour period starting at about 100° C. and increasing the temperature to about 180° C.

STEP C After drying, the sol was a friable solid that was hammermilled, roll crushed, and screened. The screened particles passed through a screen containing 1 mm openings but were retained on a screen containing 0.125 mm openings.

STEP D The screened particles were then fed into the end of a rotary calciner to substantially remove the bound volatiles. The calciner had a hot zone temperature of 700°–750° C. The residence time was about 20 min.

The remaining steps to make the abrasive grain, Steps E through G were the same as that described above in General Procedure I.

General Procedure III for Making the Abrasive Grains

The following were charged into a 6 liter stainless steel, "Waring" industrial-type blender to provide a dispersion: 2269 parts of room temperature deionized water; 45 parts of 16N analytical reagent grade nitric acid; and 643 parts of alpha aluminum oxide monohydrate powder ("DISPERAL"). In some instances, the secondary component metal salts were added to this dispersion. The concentrations of these salts were the same as described above in General Procedure I (if used). The resulting mixture was dispersed at high speed for three to four minutes. The resulting mixture was dried in a forced air oven at 100° C. for about 24 hours to a friable solid. The resulting dried material was crushed using a "Braun" type UD pulverizer having a 1.1 mm gap between the steel plates to form particles. The particles were screened between 0.125 to 1 mm screen size. The screen retained particles were fed into a kiln to form calcined particles. The calciner was as described above for General Procedure I. The calciner had a hot zone temperature of 650° C. Next, the calcined particles were fed into a 1400° C. rotary kiln, as described above for General Procedure I. The product exited the kiln into room temperature air where it was collected in a metal container and allowed to cool to room temperature.

General Procedure IV for Making the Abrasive Grains

A 7.3% alpha alumina dispersion was prepared by acidifying with nitric acid a 55% solids slurry of alpha alumina (the alpha alumina being commercially available from Alcoa Co. of Bauxite, AZ, under the trade designation "A-16 SG") to a pH between 1.6 to 2.5. The slurry was then diluted to maintain fluidity and ball milled in the presence of alumina milling media for 25 days. The milled slurry was centrifuged and aged by allowing it to stand for about 2 years and then redispersed.

The following were charged into a 2 liter stainless steel, "Waring" industrial-type blender: 1800 parts of room temperature deionized water; 46 parts of 16N analytical reagent grade nitric acid; 160 parts of the 7.3% alpha alumina dispersion; and 780 parts of alpha aluminum oxide monohydrate powder ("DISPERAL"). The resulting mixture was blended for about one minute to provide a dispersion or sol. The dispersion was placed in an Erlenmeyer flask, deaired by pulling a partial vacuum with an aspirator, and then poured into glass trays. The material was then dried in a conventional forced air oven at about 80° C. for about 16 hours. The resulting dried gel was crushed, screened, and calcined as described above in the section entitled "General Procedure IV For Making the Abrasive Grains." The calcined grits were sintered by placing them in a platinum crucible which was inserted into a conventional box furnace at temperature. The sintering temperature ranged from 1100° C. to 1300° C. The sintering time was 20 minutes.

General Procedure for Making Coated Abrasive Discs

The abrasive grain were incorporated into coated abrasive products which were then tested for abrasiveness. The coated abrasive products were made according to conventional coated abrasive-making procedures. A grade 50 abrasive grain was prepared by taking 50% by weight from abrasive grains that passed through a 40 mesh U.S. standard screen, but remained on a 45 mesh U.S. standard screen and 50% by weight of abrasive grains that passed through a 45 mesh U.S. standard screen, but were retained on a 50 mesh U.S. standard screen. Likewise, a grade 36 abrasive grain was prepared by taking 50% by weight from abrasive grains that passed through a 25 mesh U.S. standard screen, but remained on a 30 mesh U.S. standard screen. The remaining 50% were abrasive grains that passed through a 30 mesh U.S. standard screen, but were retained on a 35 mesh U.S. standard screen. Using conventional techniques, the abrasive grain were bonded to vulcanized fibre backings using conventional calcium carbonate filled phenolic make resin and conventional calcium carbonate filled phenolic size resins. The fibre discs were flexed prior to testing.

If the cured abrasive fiber disc was to be tested by abrading stainless steel, a supersize coating was applied over the size coat. The supersize coating comprised 29.6 parts of a diglycidyl ether of bisphenol A epoxy resin coatable from water (commercially available under the trade designation "CMD 35201" from Rhone-Poulenc, Jeffersontown, Ky.), 0.035 parts of a 2-ethyl-4-methyl imidazole curing agent (commercially available under the trade designation "EMI-24" from Air Products) and 12 parts water, 55 parts potassium tetrafluoroborate, 2.3 parts iron oxide (colorant), and 0.78 parts wetting agent. The supersize coated fiber disc was heated to cure the epoxy resin. For further details regarding this supersize, see copending application having U.S. Ser. No. 07/610,701, filed Nov. 14, 1990, the disclosure of which is incorporated herein by reference for its teaching of making this supersize.

Test Procedure I

The coated abrasive disc was mounted on a beveled aluminum back-up pad and used to grind the face of a 2.5 cm by 18 cm 1018 mild steel workpiece. The disc was driven at 5000 rpm while the portion of the disc overlaying the beveled edge of the back-up pad contacted the workpiece with a pressure of about 9.1 kg/cm$^2$. Each disc was used to grind a separate workpiece for a one-minute interval. The total cut was the summation of the amount of the workpiece removed for each of 12 one-minute intervals. The initial cut was the amount of metal removed in the first minute of grinding. The final cut was the amount of metal removed in the last minute of the test. There were about four discs per example tested.

Test Procedure II

The coated abrasive disc was mounted on a beveled aluminum back-up pad, and used to grind the face of a 1.25 cm by 18 cm 1018 mild steel workpiece. The disc was driven at 5500 rpm while the portion of the disc overlaying the beveled edge of the back-up pad contacted the workpiece at about a 6 kg load. Each disc was used to grind a separate workpiece for a one-minute interval for a total time of 12 minutes. The total cut was the summation of the amount of the workpiece removed throughout the test. There were approximately four discs per Example tested.

Test Procedure III

The Test Procedure III was essentially the same as Test Procedure II, except that the test endpoint was 20 minutes.

Test Procedure IV

The Test Procedure IV was essentially the same as Test Procedure II, except that the workpiece was 304 stainless steel.

Test Procedure V

The Test Procedure V was essentially the same as Test Procedure I, except that the test endpoint was 20 minutes.

Comparative Example A

The abrasive grain was made according to General Procedure I except for the following changes. Only steps A through D were performed, so that the resulting material was calcined but not fully sintered and the material was not impregnated. Likewise, the material was crushed into a fine powder. This powder was subjected to a Differential Thermal Analysis (DTA) ("DUPONT 1090" from E.I. dupont of Wilmington, Del.) that had a heating rate of 20° C. per minute. The alpha alumina transformation temperature of this material was 1213° C.

Example 1

This example demonstrates the lowering of the transformation temperature by the incorporation of manganese oxide. The abrasive grain was made according to General Procedure I except for the following changes. Only steps A through F were performed, so that the resulting material was calcined but not fully sintered. Calcined particles were soaked in excess impregnation solution and then filtered to remove any solution which had not penetrated the calcined particles. The impregnating solution was a 50% solution of $Mn(NO_3)_2$. The resulting material was crushed into a fine powder. This powder was subjected to a DTA that had a heating rate of about 20° C. per minute. In comparing Example 1 to Comparative Example A, the addition of the manganese oxide lowered the transformation temperature by about 155° C.

The calcined, but not fully sintered material from Example 1, was also examined by high temperature X-ray diffraction. When heated in air, the sample was found to include eta alumina and the cubic form of $Mn_2O_3$ up to about 920° C. At about 960° C., alpha alumina was first detected. At about 1000° C., manganese spinel was found.

After the material from Example 1 was fully sintered, the abrasive grain comprised 19.2% manganese oxide (calculated on a theoretical oxide basis as $Mn_2O_3$) and 80.8% aluminum oxide present as spinel (i.e., $MnAlO_4$) and alpha alumina. The theoretical density for this abrasive grain was calculated to be 4.068 g/cm$^3$. The actual density was measured to be 3.673 g/cm$^3$. Thus, the density as a percent of theoretical was 90.3%. The hardness was measured to be 13.6 GPa and the toughness was 3.7 MPa·m$^{1/2}$. The relatively low value of the hardness is believed due to the large amount of porosity present as shown by the low percent theoretical density.

Examples 2–6

The abrasive grains for Examples 2–6 were made according to the General Procedure I except for the following changes. A 50% solution of reagent grade manganese nitrate was diluted to 40%, 30%, and 20% solutions (as called for), and then impregnated into the calcined particles as described in Example 1. The abrasive grain for Example 2 utilized the 30% reagent solution and the abrasive grain precursor was impregnated two times with this solution. After each impregnation, the resulting particles were dried and calcined. The abrasive grain for Examples 3, 4, 5, and 6 utilized the 50%, 40%, 30%, and 20% reagent solutions, respectively, and the abrasive grains were impregnated only once. The sintered abrasive grain for Examples 2, 3, 4, 5, and 6 comprised 12%, 10%, 8%, 6%, and 4% manganese oxide (calculated on a theoretical oxide basis as MnO), respectively, with the remainder being aluminum oxide.

Comparative Example B

The abrasive grain for Comparative Example B was a brown fused aluminum oxide.

The abrasive grain were screened such that they pressed through a 30 mesh U.S. Standard screen but were retained on a 40 mesh U.S. Standard screen. The screened abrasive grain were incorporated into discs using the General Procedures for Making Coated Abrasive Discs. The size coat contained 66% calcium carbonate with the remainder being a cured resole phenolic resin. The discs were tested according to Test Procedure I. The results are provided in Table 1, below.

TABLE 1

Grinding Performance Test Procedure I

| Example | Total cut, % of Comparative B |
|---|---|
| 2 | 233 |
| 3 | 265 |
| 4 | 255 |
| 5 | 138 |
| 6 | 163 |
| Comparative B | 100 |

Examples 3, 7, and 8

Abrasive grain for Examples 7 and 8 were made and tested in the same manner as Example 3, except for different sintering atmospheres. The atmosphere for Example 3 was air. The sintering atmosphere for Example 7 was 95% nitrogen and 5% hydrogen. The sintering atmosphere for Example 8 was 100% nitrogen. The test results are provided in Table 2, below.

TABLE 2

Grinding Performance Test Procedure I

| Example | Total cut, grams |
|---|---|
| 3 | 121 |
| 7 | 151 |
| 8 | 266 |

Example 9 and Comparative A

This example concerned comparison of the microstructure of an abrasive grain containing manganese oxide (Example 9) to one that did not (Comparative A).

The abrasive grain for Example 9 was prepared according to General Procedure III except that manganese oxide and magnesium nitrate (as a salt) were provided in the original dispersion as follows. $Mn_2O_3$ powder (commercially available from Cerac, Inc.) was ball milled with zirconia media and reduced in size from about 10 micrometers to about 2.2 micrometers. This powder was added to the dispersion at a 2% level. Magnesium nitrate was also added so that the sintered abrasive grain comprised 96% aluminum oxide, 2% manganese oxide, and 2% magnesium oxide.

The abrasive grain of Example 9 was examined with polarized light under an optical microscope and observed to have cells that were one micrometer in size. In comparison, Comparative Example A had cells ranging in size between 10 to 15 micrometers in size.

Examples 10–14

The abrasive grain for Examples 10–14 were made according to General Procedure II. The impregnation solution contained lanthanum nitrate and manganese nitrate. The amounts of these materials were selected to provide the (sintered) abrasive grain compositions listed in Table 3, below.

TABLE 3

Abrasive Grain Compositions

| Example | % $Al_2O_3$ | % $La_2O_3$ | % MnO |
|---|---|---|---|
| 10 | 96 | 1.3 | 2.7 |
| 11 | 91.3 | 2.9 | 5.8 |
| 12 | 89.4 | 4.8 | 5.8 |
| 13 | 92 | 5 | 3 |
| 14 | 94.3 | 5.3 | 0.4 |

The abrasive grain were screened to grade 50 and tested according to Test Procedure II. The test results, density, hardness and toughness are provided in Table 4, below.

TABLE 4

Physical Properties and Grinding Performanae

| Example | Hardness GPa | Toughness MPa · ½ | Total cut, grams | Density g/cm³ |
|---|---|---|---|---|
| 10 | 22.1 | ** | 689 | ** |
| 11 | 20.4 | 2.2 | 783 | 3.98 |
| 12 | 20.9 | 2.6 | 913 | 4.00 |
| 13 | 19.6 | 3.9 | 708 | 3.94 |
| 14 | 20.6 | 2.7 | 757 | 3.87 |

**not measured

Example 15 and Comparative Examples D–I

The abrasive grain for Example 15 and Comparative Examples D-I were made according to General Procedure II. The various impregnation solutions contained lanthanum nitrate, manganese nitrate, magnesium nitrate, nickel nitrate, or zinc nitrate such that the resulting abrasive grain had the compositions listed in Table 5, below.

TABLE 5

Abrasive Grain Compositions

| Example | % $Al_2O_3$ | % $La_2O_3$ | % MnO | % MgO | % ZnO | % NiO |
|---|---|---|---|---|---|---|
| 15 | 91.3 | 3.2 | 4.5 | 0 | 0 | 0 |
| Comp. D | 95.2 | 3.2 | 0 | 1.6 | 0 | 0 |
| Comp. E | 94.1 | 3.1 | 0 | 2.8 | 0 | 0 |
| Comp. F | 91.8 | 2.8 | 0 | 5.4 | 0 | 0 |
| Comp. G | 91.5 | 2.8 | 0 | 5.7 | 0 | 0 |
| Comp. H | 92.3 | 3 | 0 | 0 | 0 | 4.7 |
| Comp. I | 91.8 | 3.1 | 0 | 0 | 5.1 | 0 |

The abrasive grain were screened to a grade 36 and incorporated into coated abrasive discs using the General Procedure for Making Coated Abrasive Discs. The discs were tested using Test Procedure III. The test results, density, and hardness are provided in Table 6, below.

TABLE 6

Physical Properties and Grinding Performance

| Example | Density, g/cm³ | Hardness, GPa | Total cut, grams |
|---|---|---|---|
| 15 | 3.98 | 22.3 | 1987 |
| Comp. D | 3.89 | ** | 1807 |
| Comp. E | 3.90 | 21.2 | 1700 |
| Comp. F | 3.90 | 21.7 | 1944 |
| Comp. G | 3.87 | 22 | 1922 |

TABLE 6-continued

Physical Properties and Grinding Performance

| Example | Density, g/cm$^3$ | Hardness, GPa | Total cut, grams |
|---|---|---|---|
| Comp. H | 3.99 | 22.3 | 1881 |
| Comp. I | 3.97 | 22.2 | 1780 |

It is evident from the above data that manganese oxide was a beneficial addition to the abrasive grain, with respect to a combination of hardness, density, and performance factors.

Examples 16–24 and Comparative Example J

The abrasive grain for Examples 16–24 and Comparative Example J were made according to General Procedure II. The impregnation solution contained lanthanum nitrate, and manganese nitrate. The amounts of these materials were selected to provide the abrasive grain compositions listed in Table 7, below.

TABLE 7

Abrasive Grain Compositions

| Example | % Al$_2$O$_3$ | % La$_2$O$_3$ | % MnO |
|---|---|---|---|
| Comparative J | 95.2 | 4.8 | 0 |
| 16 | 94.7 | 4.8 | 0.5 |
| 17 | 92.2 | 4.8 | 3 |
| 18 | 90.2 | 4.8 | 5 |
| 19 | 88.2 | 4.8 | 7 |
| 20 | 94 | 0 | 6 |
| 21 | 93 | 1 | 6 |
| 22 | 91 | 3 | 6 |
| 23 | 89.2 | 4.8 | 6 |
| 24 | 88 | 6 | 6 |

The abrasive grain were screened to grade 36 and incorporated into coated abrasive discs using the General Procedures for Making Coated Abrasive Discs. The discs were tested according to Test Procedure II. The test results, density, and hardness are provided in Table 8, below. Further, the microstructure for each of these abrasive grain were observed by using an optical microscope. The type of microstructure observed for each example is provided in Table 8, below.

TABLE 8

Physical Properties and Grinding Performance

| Example | Hardness, GPa | Microstructure | Total cut, grams | Density g/cm$^3$ |
|---|---|---|---|---|
| Comparative J | 21.5 | lath-like | 991 | 3.88 |
| 16 | 19.8 | lath-like | 1046 | 3.83 |
| 17 | 18.7 | cellular | 983 | 3.88 |
| 18 | 19.8 | cellular | 1079 | 3.96 |
| 19 | 20.9 | mixed | 1119 | 4.01 |
| 20 | 13.6 | submicrometer, faceted | 767 | 3.52 |
| 21 | 19.2 | submicrometer, faceted | 947 | 3.94 |
| 22 | 20 | submicrometer, faceted | 1043 | 3.94 |
| 23 | 21.4 | cellular | 1070 | 4.01 |
| 24 | 19.4 | cellular | 1054 | 4.02 |

The mixed microstructure was a combination of grits having a cellular microstructure, a submicrometer, faceted microstructure, and both a cellular and submicrometer, faceted microstructure in different regions of the same abrasive grain (grit).

The transformation temperatures were measured for Examples 20–23. The abrasive grain were made according to General Procedure II except for the following changes. Only steps A through F were performed, so that the resulting material was calcined but not fully sintered. Further, the material was crushed into a fine powder. The resulting powder was subjected to a DTA ("NETZSCH STA 409," (Simultaneous Thermal Analysis), from Netzsch-Geratebau GmbH, Germany) at a heating rate of about 20° C. per minute. The onset temperatures and peak temperatures observed are provided in Table 9, below.

TABLE 9

Differential Thermal Analysis Data

| Example | Onset temperature, °C. | Peak temperature, °C. |
|---|---|---|
| 20 | 1109 | 1159 |
| 21 | 1124 | 1146 |
| 22 | 1211 | 1238 |
| 23 | 1243 | 1290 |

Examples 25 through 29

The abrasive grain for Examples 25–29 were made according to General Procedure II. The impregnation solution contained neodymium nitrate and manganese nitrate. The amounts of these materials were selected to provide the abrasive grain compositions listed in Table 10, below.

TABLE 10

Abrasive Grain Compositions

| Example | % Al$_2$O$_3$ | % Nd$_2$O$_3$ | % MnO |
|---|---|---|---|
| 25 | 98.5 | 1 | 0.5 |
| 26 | 93 | 1 | 6 |
| 27 | 94.7 | 4.8 | 0.5 |
| 28 | 89.2 | 4.8 | 6 |
| 29 | 94.6 | 2.4 | 3 |

The abrasive grains were screened to grade 36 and incorporated into coated abrasive discs using the General Procedures for Making Coated Abrasive Discs. The discs were tested according to Test Procedure II. The test results, density, and hardness physical measurements are provided in Table 11, below. Further, the microstructures for these abrasive grain were observed by using an optical microscope. The type of microstructure observed for each example is provided in Table 11, below.

TABLE 11

Physical Properties and Grinding Performance

| Example | Hardness, GPa | Microstructure | Total cut, grams | Density g/cm$^3$ |
|---|---|---|---|---|
| 25 | 16.4 | cellular | 855 | 3.60 |
| 26 | 20.7 | submicrometer, faceted | 976 | 3.83 |
| 27 | 19.8 | cellular | 1156 | 3.87 |
| 28 | 20.8 | mixed | 1103 | 4.02 |
| 29 | 20.1 | cellular | 1016 | 3.88 |

Examples 30 and 31 and Comparative Example K–N

The abrasive grain for Examples 30 and 31 and Comparative K–N were made according to General Procedure II, with the following modifications. For Example 30 and Comparative Examples L and M, there was more than one impregnation step. The calcined particles were first impregnated with zirconyl acetate, dried and calcined. The resulting particles were impregnated a second time with the mixture so as to provide sintered abrasive grain having the compositions listed in Table 12, below. The second impregnation solution contained lanthanum nitrate, magnesium nitrate, optionally yttrium nitrate, and optionally manganese nitrate. For Example 31 and Comparative Examples K and N, there was only one impregnation step. The impregnation solution contained lanthanum nitrate, magnesium nitrate, optionally yttrium nitrate, optionally zirconyl acetate, and optionally manganese nitrate. The sintered abrasive grain had the composition listed in Table 12, below.

TABLE 12

Abrasive Grain Compositions

| Example | % $Al_2O_3$ | % MgO | % $ZrO_2$ | % $La_2O_3$ | % MnO | % $Y_2O_3$ |
|---|---|---|---|---|---|---|
| Comp. K | 96 | 1.3 | 0 | 2.7 | 0 | 0 |
| Comp. L | 96 | 1.3 | 0 | 2.7 | 0 | 0 |
| Comp. M | 96 | 1.3 | 0 | 2.7 | 0 | 1.3 |
| Comp. N | 91.7 | 1.3 | 3 | 2.7 | 0 | 1.3 |
| 30 | 91.2 | 1.3 | 3 | 2.7 | 0.5 | 1.3 |
| 31 | 90.7 | 1.3 | 3 | 2.7 | 1 | 1.3 |

The hardness, density, and toughness of the abrasive grain are provided in Table 13, below.

TABLE 13

Physical Properties

| Example | Hardness, GPa | Density, g/cm$^3$ | Toughness, MPa · m$^{1/2}$ |
|---|---|---|---|
| Comp. K | 21 | 3.92 | 3.6 |
| Comp. L | 22 | 4.03 | 4.2 |
| Comp. M | 22.3 | 4.04 | 4.4 |
| Comp. N | 21.9 | 3.91 | 4.5 |
| 30 | 22.1 | 4.06 | 3.6 |
| 31 | 21.2 | 3.92 | 4 |

The abrasive grain were screened to a grade 36 and incorporated into coated abrasive discs using the Procedures for Making Coated Abrasive Discs. The discs were tested according to Test Procedures II and IV. The discs for the latter test were supersized. The test results are provided in Table 14, below.

TABLE 14

Grinding Performance

| Example | Test procedure II, Total cut, grams | Test procedure IV, Total cut, grams |
|---|---|---|
| Comp. K | 1174 | 213 |
| Comp. L | 1218 | 223 |
| Comp. M | 1236 | 221 |
| Comp. N | 1087 | 198 |
| 30 | 1203 | 192 |
| 31 | 1022 | 187 |

Examples 32–34 and Comparative Example O

The abrasive grain of Examples 32–34 were made according to General Procedure II with the following modifications. For each of Examples 32–34 there was only one impregnation step. The impregnation solution contained lanthanum nitrate, magnesium nitrate, optionally neodymium nitrate, optionally yttrium nitrate, zirconyl acetate and optionally manganese nitrate. The sintered abrasive grain had the compositions listed in Table 15, below. The abrasive grain for Comparative Example O was a sol-gel derived aluminum-based abrasive grain comprising 95.6% aluminum oxide, 1.1% lanthanum oxide, 1.1% neodymium oxide, 1.1% magnesium oxide, and 1.1% yttrium oxide (available from the 3M Company of St. Paul, Minn., under the trade designation "321 CUBITRON").

TABLE 15

Abrasive Grain Compositions

| Ex | % $Al_2O_3$ | % MgO | % $ZrO_2$ | % $La_2O_3$ | % $Nd_2O_3$ | % MnO | % $Y_2O_3$ |
|---|---|---|---|---|---|---|---|
| 32 | 93.5 | 1.3 | 1 | 2.7 | 0 | 0.5 | 1 |
| 33 | 92.5 | 1.5 | 1 | 1.5 | 1.5 | 1 | 1 |
| 34 | 91.5 | 3.5 | 1 | 3 | 0 | 1 | 1 |

The abrasive grain were screened to grade 36 and incorporated into coated abrasive fibre discs. The discs were tested according to Test Procedure II. The test results are provided in Table 16, below.

TABLE 16

Grinding Performance

| Example | Total cut, % of Comparative O |
|---|---|
| Comparative O | 100 |
| 32 | 106 |
| 33 | 104 |
| 34 | 104 |

Examples 35–40

The abrasive grain of Examples 35–40 were made according to General Procedure II. The impregnation solution contained lanthanum nitrate and manganese nitrate. The amounts of these materials were selected to provide the abrasive grain compositions listed in Table 17, below. Further, the density and the type of microstructure observed are reported in Table 17, below.

TABLE 17

| Ex | % $Al_2O_3$ | % $La_2O_3$ | % MnO | Density, g/cm$^3$ | Microstructure |
|---|---|---|---|---|---|
| 35 | 91 | 3 | 6 | 3.97 | submicrometer, faceted |
| 36 | 94 | 4 | 2 | 3.90 | submicrometer, faceted |
| 37 | 97 | 2 | 1 | 3.76 | submicrometer, faceted |
| 38 | 98.5 | 1 | 0.5 | 3.42 | mixed |
| 39 | 92 | 6 | 2 | 3.99 | submicrometer, faceted |
| 40 | 96 | 3 | 1 | 3.78 | mixed |

Examples 41–45 and Comparative Example O

The abrasive grain of Examples 41–45 were made according to General Procedure II. The abrasive grain had a formulation of 92% aluminum oxide, 6% manganese oxide, and 2% lanthanum oxide. Listed in Table 18 (below) were the firing temperature, the firing time, the density, and the crystallite size. The crystallite size was determined by examining a fractured surface of abrasive grain under a scanning electron microscope.

TABLE 18

Effect of Firing Conditions

| Ex | Temperature, °C. | Time, minutes | Density, g/cm³ | Hardness, GPa | Grain size, micrometers |
|---|---|---|---|---|---|
| 41 | 1400 | 30 | 4.02 | 21.2 | 0.5 to 1.5 |
| 42 | 1400 | 6.5 | 4.02 | 22.5 | 0.3 to 1 |
| 43 | 1350 | 12 | 4.03 | 22.4 | 0.3 to 0.8 |
| 44 | 1300 | 30 | 4.02 | 23.4 | 0.2 to 0.8 |
| 45 | 1300 | 6.5 | 4.00 | 24.8 | 0.1 to 0.4 |
| Comparative O | | | | 19.5 | |

The abrasive grain were screened to a grade 36 and incorporated into fibre discs. The coated abrasive discs were tested according to Test Procedure II. The test results are provided in Table 19, below.

TABLE 19

Test Procedure II

| Example | Total cut, grams |
|---|---|
| 41 | 1029 |
| 42 | 1074 |
| 43 | 1080 |
| 44 | 1042 |
| 45 | 1011 |
| Comparative O | 1082 |

Examples 46–52 and Comparative Example O

The abrasive grain of Examples 46–52 were made according to General Procedure II. The impregnation solution contained lanthanum nitrate and manganese nitrate. The amounts of these materials were selected to provide the abrasive grain compositions listed in Table 20, below. The abrasive grain of Examples 46–50 were fired for 6 minutes at 1300° C. The abrasive grain for Example 51 were fired for 30 minutes at 1300° C. The abrasive grain for Example 52 were fired for 6 minutes at 1400° C.

TABLE 20

| Example | % Al₂O₃ | % La₂O₃ | % MnO | Density, g/cm³ |
|---|---|---|---|---|
| 46 | 92 | 2 | 6 | 3.96 |
| 47 | 91.5 | 2.5 | 6 | 3.90 |
| 48 | 91 | 3 | 6 | 3.88 |
| 49 | 90.5 | 3.5 | 6 | 3.88 |
| 50 | 90 | 4 | 6 | 3.88 |
| 51 | 90 | 4 | 6 | 3.88 |
| 52 | 90 | 4 | 6 | 3.95 |

The abrasive grains were screened to a grade 36 and incorporated into coated abrasive fibre discs. The coated abrasive discs were tested according to Test Procedure II. The test results and density are provided in Table 21, below.

TABLE 21

Test Procedure II

| Example | Total cut, % of Comparative O | Density, g/cm³ |
|---|---|---|
| 46 | 104 | 3.96 |
| 47 | 109 | 3.90 |
| 48 | 101 | 3.88 |
| 49 | 105 | 3.88 |
| 50 | 105 | 3.88 |
| 51 | 111 | 3.88 |
| 52 | 109 | 3.95 |
| Comparative O | 100 | |

Examples 53–55

The abrasive grain of Examples 53–55 were made according to General Procedure II. The impregnation solution contained manganese nitrate and yttrium nitrate. The composition of each example is provided in Table 22, below.

TABLE 22

| Ex | % Al₂O₃ | % Y₂O₃ | % MnO | Density, g/cm³ | Microstructure |
|---|---|---|---|---|---|
| 53 | 93 | 1 | 6 | 3.79 | submicrometer, faceted |
| 54 | 92 | 2 | 6 | 3.84 | cellular |
| 55 | 90 | 4 | 6 | — | cellular |

Examples 56–58 and Comparative Example L

The abrasive grain of Examples 56–58 and Comparative Example L were made according to General Procedure II, except for the following changes. The original dispersion contained a 20% solids zirconia sol (from Nyacol Products, Inc., of Ashland, Mass.). The average particle size of the zirconia sol was between 5 to 10 nanometers. The impregnation solution contained manganese nitrate. The sintered abrasive grain were made such that they had the formulations listed in Table 23, below.

TABLE 23

| Example | % Al₂O₃ | % ZrO₂ | % MnO |
|---|---|---|---|
| 56 | 97 | 2 | 1 |
| 57 | 96 | 2 | 2 |
| 58 | 93 | 2 | 5 |
| Comparative L | 98 | 2 | 0 |

The abrasive grain were screened to a grade 36 and incorporated into coated abrasive fibre discs. The coated abrasive discs were tested according to Test Procedure II. The results are provided in Table 24, below.

TABLE 24

| Example | Total cut, grams |
|---|---|
| 56 | 573 |
| 57 | 641 |
| 58 | 905 |
| Comparative L | 480 |

It is apparent the additions of the manganese oxide to the alumina-zirconia abrasive grain drastically improved the grinding performance on mild steel.

Figure 11:
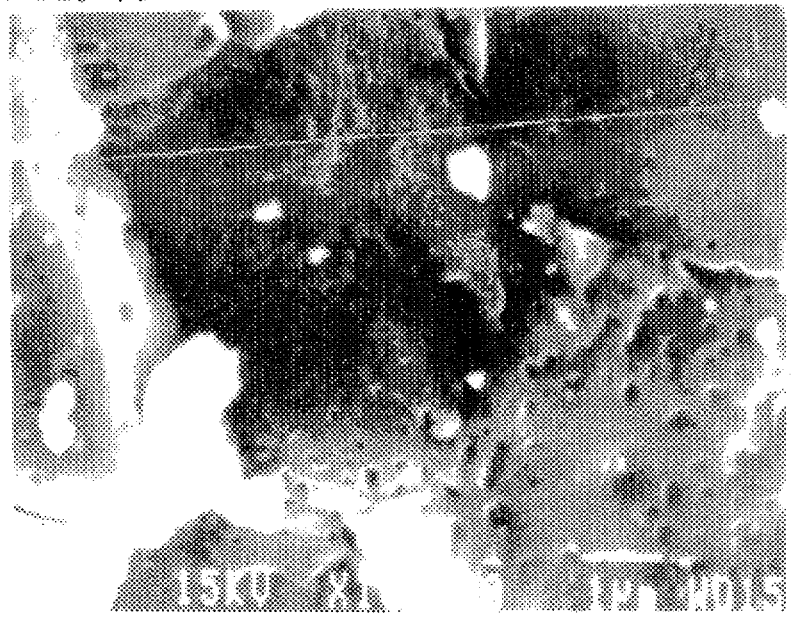
FIG. 11 is a scanning electron photomicrograph of the abrasive grain of Example 56 taken at 10,000×.
Figure 12:
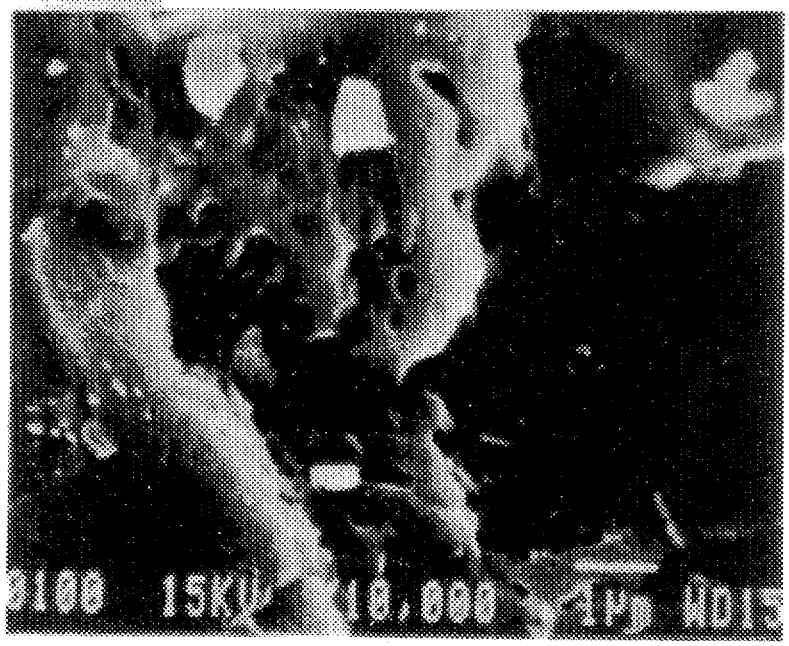
FIG. 12 is a scanning electron photomicrograph of the abrasive grain of Example 57 taken at 10,000×.
Figure 13:
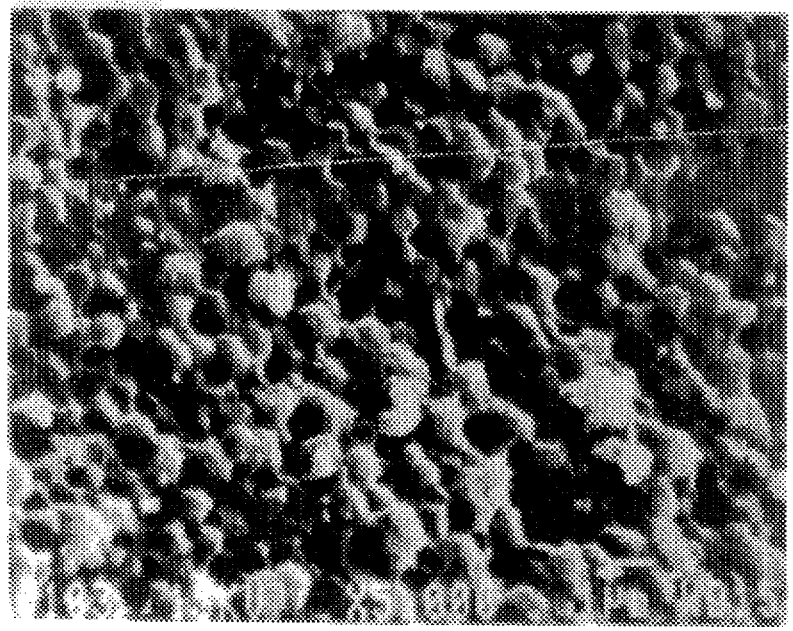
FIG. 13 is a scanning electron photomicrograph of the abrasive grain of Example 58 taken at 5,000×.

Fractured surfaces of these abrasive grain were made and examined under a scanning electron microscope at 5000 magnification. FIGS. 11, 12, and 13 correspond to Examples 56, 57, and 58, respectively. It was surprising that small differences in the level of manganese oxide resulted in different abrasive grain microstructures. FIGS. 10 and 11 present the cellular microstructure, FIG. 12 a mixed microstructure, and FIG. 13 a submicrometer, faceted microstructure.

Example 59 and Comparative Example P

Example 59 and Comparative Example P show density and hardness as a function of sintering temperature for an abrasive grain prepared with an alpha alumina seed material. Example 59 and Comparative Example P were made according to General Procedure IV, except that for Example 59, the calcined grits were impregnated under partial vacuum using an Erlenmeyer flask (as described in the section above entitled "General Procedure IV for Making the Abrasive Grains") with about 275 ml of a solution of 12.5 parts of manganese nitrate solution (20%, on a theoretical oxide basis, MnO) prepared with deionized water and 262.5 parts deionized water. After excess solution was removed by filtering using conventional filter paper, the grits were dried, calcined at about 650° C., and then sintered. The sintering temperatures and corresponding density and hardness data are provided in Table 25, below.

TABLE 25

Density and Hardness Data

| Sintering temp., °C. | Density, g/cm³ Ex. 59 | Density, g/cm³ Comp. P | Hardness, GPa Ex. 59 | Hardness, GPa Comp. P |
| --- | --- | --- | --- | --- |
| 1050 | — | * | 9.8 | * |
| 1100* | 3.89 | 3.95 | 23.8 | 9.0 |
| 1150 | 3.95 | 3.94 | 25.9 | 17.3 |
| 1200 | 3.95 | 3.84 | 24.3 | 22.4 |
| 1250 | 3.96 | 3.86 | 23.6 | 22.3 |
| 1300 | 3.96 | 3.93 | 21.9 | 25.1 |

* not tested

Example 60 and Comparative Example Q

Example 60 and Comparative Example Q show the effect manganese additions on the densification of abrasive grain prepared with an alpha iron oxide nucleating material. Comparative Example Q was made according to the teachings of U.S. Pat. No. 4,964,883 (Morris et al.), the disclosure of which is incorporated herein by reference. The composition of Comparative Example Q was, on a theoretical oxide basis, 0.75% $Fe_2O_3$, 0.5% MgO, and the balance $Al_2O_3$.

Example 60 was made by impregnating calcined grits of Comparative Example Q with the same impregnate solution as described in Example 59. The grits for both Example 60 and Comparative Example Q were sintered at 1150° C. for 45 minutes. The density and red dye results are provided in Table 26, below.

TABLE 26

Density and Red Dye Data

| Example | Density, g/cm³ | Red dye test |
| --- | --- | --- |
| 60 | 3.94 | clean |
| Comp. Q | 3.95 | red |

Examples 61–66

Examples 61–66 show the effect of sintering time on hardness when sintering an alpha alumina seeded (2% alpha alumina seed) grit at a temperature of 1150° C. Examples 61–66 were made in the same manner as Example 59, except the sintering was done at 1150° C. for the time listed in Table 27, below. The resulting composition was, on a theoretical oxide basis, 99.5% $Al_2O_3$ and 0.5% MnO.

TABLE 27

Sintering and Hardness Data

| Example | Time at 1150° C., min. | Hardness, GPa |
| --- | --- | --- |
| 61 | 1 | 19.0 |
| 62 | 2.5 | 21.6 |
| 63 | 5 | 23.5 |
| 64 | 10 | 25.2 |
| 65 | 15 | 24.2 |
| 66 | 20 | 24.0 |

Examples 67–69 and Comparative Example R

Examples 67–69 show the effect of sintering temperature on the density and hardness. Examples 67–69 were made according to General Procedure II, except that the sintering was done in a rotary kiln for the temperatures listed in Table 28, below. The resulting abrasive grain, on a theoretical oxide basis, was 92% $Al_2O_3$, 6% MnO, and 2% $La_2O_3$. The density and hardness are provided in Table 28, below. Grinding performance data is shown in Tables 29–31, below.

TABLE 28

Sintering, Density, and Hardness Data

| Example | Temp., °C. | Density g/cm³ | Hardness, GPa |
| --- | --- | --- | --- |
| 67 | 1200 | 3.89 | 18.4 |
| 68 | 1250 | 4.01 | 22.6 |
| 69 | 1300 | 4.01 | 22.7 |

Comparative Example R was a sol-gel derived aluminum-based abrasive grain comprising, on a theoretical oxide basis, about 99% $Al_2O_3$ and about 1% $Fe_2O_3$ (available from the 3M Company of St. Paul, Minn., under the trade designation "221 CUBITRON").

TABLE 29

Grinding Performance Test Procedure III

| Example | Initial cut, g | Final cut, g | Total cut, g | Total cut, % of Comp. R |
|---|---|---|---|---|
| 67 | 78 | 40 | 1237 | 71 |
| 68 | 78 | 59 | 1518 | 87 |
| 69 | 78 | 59 | 1480 | 84 |
| Comp. R | 76 | 82 | 1754 | 100 |

TABLE 30

Grinding Performance Test Procedure II

| Example | Initial cut, g | Final cut, g | Total cut, g | Total cut, % of Comp. R |
|---|---|---|---|---|
| 67 | 72 | 50 | 743 | 69 |
| 68 | 80 | 57 | 893 | 83 |
| 69 | 80 | 72 | 940 | 88 |
| Comp. R | 80 | 89 | 1071 | 100 |

TABLE 31

Grinding Performance Test Procedure V

| Example | Initial cut, g | Final cut, g | Total cut, g | Total cut, % of Comp. R |
|---|---|---|---|---|
| 67 | 111 | 2 | 1128 | 48 |
| 68 | 117 | 37 | 1768 | 76 |
| 69 | 116 | 58 | 1891 | 81 |
| Comp. R | 126 | 99 | 2333 | 100 |

Comparative Example S

Comparative Example S was prepared by General Procedure II except that the sol was dried in glass trays and then crushed. An impregnation solution was prepared by combining 1.25 grams of a manganese nitrate ($Mn(NO_3)_2$) solution (containing, on a theoretical oxide basis, 20% MnO) and 0.9 grams of a lanthanum nitrate ($La(NO_3)_3$) solution (containing, on a theoretical oxide basis, 28% $La_2O_3$) with a sufficient amount of deionized water to produce 150 ml of solution. This solution was then impregnated into 250 grams of the calcined grit. After the second calcining, the grit was sintered in 50 gram batches at 1400° C. for 10 minutes. The resulting abrasive grain was, on a theoretical oxide basis, 0.1% MnO, 0.1% $La_2O_3$, and 99.8% $Al_2O_3$. The density and hardness of the abrasive grain were 3.43 g/cm³ and 9.8 GPa, respectively.

Examples 70–75

Examples 70–75 show that a manganese oxide and rare earth oxide composition can be sintered to a high density at temperatures at least as low as 1100° C. Examples 70–75 were prepared by the same method as Comparative Example S except that the impregnation solution was prepared by mixing 143.7 grams of the manganese nitrate solution and 30.8 grams of the lanthanum nitrate solution with a sufficient amount of deionized water to produce 150 ml of solution. The grit was sintered in approximately 20 gram batches for 10 minutes at the temperature listed in Table 32, below. The resulting abrasive grains were, on a theoretical oxide basis, 10% MnO, 3% $La_2O_3$, and 87% $Al_2O_3$. The density of the abrasive grains is given in Table 32, below.

TABLE 32

Sintering and Density Data

| Example | Temp., °C. | Density g/cm³ |
|---|---|---|
| 70 | 1100 | 3.84 |
| 71 | 1150 | 3.98 |
| 72 | 1200 | 4.00 |
| 73 | 1250 | 4.05 |
| 74 | 1300 | 4.06 |
| 75 | 1400 | 4.06 |

Example 76

Example 76 was prepared as Examples 70–75 except the sintering temperature of the rotary kiln was 1350° C. The density and hardness of the sintered abrasive grain were 4.06 g/cm³ and 20.9 GPa, respectively. The grinding data is provided in Table 33, below.

TABLE 33

Grinding Performance Test Procedure II

| Example | Initial cut, g | Final cut, g | Total cut, g | Total cut, % of Comp. B |
|---|---|---|---|---|
| Comp. S | 56.9 | 37.5 | 591.7 | 115.7 |
| 76 | 91.4 | 80.7 | 1056.8 | 206.6 |
| Comp. B | 53.4 | 33.1 | 511.6 | 100.0 |

Example 77

Abrasive grain precursor was made according to steps A through D of General Procedure I. An impregnation solution was prepared by mixing 30 grams of a 50% solution of $Mn(NO_3)_2$ with a sufficient amount of deionized water to provide 60 ml of impregnation solution. The 60 ml of impregnation solution was added to about 100 grams of the calcined particles. The impregnation solution and the calcined particles were thoroughly mixed together to cause the solution to be impregnated into the calcined particles by capillary action. The resulting impregnated particles were dried such that the surfaces of the impregnated particles were relatively dry to the touch.

Samples of the dried, impregnated particles were calcined at about 650° C. using a conventional rotary calciner and then further heated in a conventional box furnace at 900° C., 1050° C., and 1175° C., respectively, for 10 minutes. A portion of each of the calcined material and the resulting material were each crushed into a fine powder and analyzed using conventional powder x-ray diffraction. The x-ray diffraction results are shown in Table 34, below.

TABLE 34

X-Ray Data

| Temp., °C. | Phases detected (Relative intensity) |
|---|---|
| 650 | η-$Al_2O_3$ (100), cubic $Mn_2O_3$ (30), tetragonal $Mn_2O_3$ (5) |
| 900 | η-$Al_2O_3$/δ-$Al_2O_3$ (100) |

TABLE 34-continued

X-Ray Data

| Temp., °C. | Phases detected (Relative intensity) |
|---|---|
| 1050 | $\eta\text{-}Al_2O_3/\delta\text{-}Al_2O_3$ (100), $\alpha\text{-}Al_2O_3$ (29) |
| 1175 | $\alpha\text{-}Al_2O_3$ (100), $Mn_{1.6}Al_{1.4}O_4$ (19) |

Example 78

Example 78 was prepared and analyzed as described in Example 77 (above) except the impregnation solution was prepared by mixing 7.2 grams of lanthanum nitrate solution (on a theoretical oxide basis 28% $La_2O_3$) and 30 grams of a 50% solution of $Mn(NO_3)_2$ with a sufficient amount of deionized water to provide 60 ml of impregnation solution. The x-ray diffraction results are shown in Table 35, below.

TABLE 35

X-Ray Data

| Temp., °C. | Phases detected (Relative intensity) |
|---|---|
| 1050 | $\eta\text{-}Al_2O_3$ (100), $\alpha\text{-}Al_2O_3$ (12)* |
| 1175 | $\alpha\text{-}Al_2O_3$ (100), $Mn_{1.4}Al_{1.6}O_4$ (15), $LaMnAl_{11}O_{19}$ (5) |

*There was a d-spacing at 3.8 Angstrom which was not attributed to any of the identified phases.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive grain comprising a ceramic alpha alumina-based material (i) having an alpha alumina submicrometer, faceted microstructure and (ii) having therein:
   (a) at least 0.1 percent by weight manganese oxide; and
   (b) at least 0.1 percent by weight oxide selected from the group consisting of zirconium oxide, yttrium oxide, lanthanum oxide, neodymium oxide, cerium oxide, praseodymium oxide, samarium oxide, gadolinium oxide, erbium oxide, ytterbium oxide, dysprosium oxide, europium oxide, hafnium oxide, and mixtures thereof,
   based on the total weight of said ceramic alpha alumina-based material, wherein said manganese oxide and said oxide of (b) are collectively present in an amount sufficient to provide an abrasive grain having an average hardness of at least 19 GPa.

2. The abrasive grain according to claim 1 having an average hardness of at least 20 GPa.

3. The abrasive grain according to claim 1 wherein said oxide in part (b) is selected from the group consisting of lanthanum oxide, neodymium oxide, cerium oxide, praseodymium oxide, samarium oxide, gadolinium oxide, erbium oxide, ytterbium oxide, dysprosium oxide, europium oxide, and mixtures thereof.

4. The abrasive grain according to claim 3 comprising an amount of manganese oxide in excess of manganese oxide that has reacted to form material represented by the formula:

$MnLnAl_{11}O_{19}$ wherein

Mn is manganese,

Al is aluminum,

O is oxygen, and

Ln is one of lanthanum, neodymium, cerium, praseodymium, samarium, gadolinium, erbium, ytterbium, dysprosium, europium, or mixtures thereof.

5. The abrasive grain according to claim 1 further comprising at least one oxide selected from the group consisting of zinc oxide, magnesium oxide, nickel oxide, silicon oxide, chromium oxide, titanium oxide, cobalt oxide, and mixtures thereof.

6. An abrasive article comprising:
   (a) a binder; and
   (b) a plurality of abrasive grain according to claim 1 secured within said article by said binder.

7. The abrasive article according to claim 6 which is a grinding wheel.

8. The abrasive article according to claim 6 which is a cutoff wheel.

9. The abrasive article according to claim 6 which is a nonwoven abrasive product.

10. A coated abrasive article comprising:
    (a) a backing having a major surface; and
    (b) an abrasive layer comprising abrasive grain according to claim 1 secured to said major surface of said backing by a binder.

11. An abrasive grain comprising a ceramic alpha alumina-based material including manganese oxide in the range from 0.1 to about 10 percent by weight and rare earth oxide in the range from 0.1 to about 10 percent by weight, based on the total weight of said ceramic alpha alumina-based material, wherein said manganese oxide and said rare earth oxide are collectively present in an amount sufficient to provide an abrasive grain having an average hardness of at least 19 GPa.

12. The abrasive grain according to claim 11 wherein said rare earth oxide is present in the range from 0.1 to 6 percent by weight.

13. An abrasive article comprising:
    (a) a binder; and
    (b) a plurality of abrasive grain according to claim 11 secured within said article by said binder.

14. A coated abrasive article comprising:
    (a) a backing having a major surface; and
    (b) an abrasive layer comprising abrasive grain according to claim 11 secured to said major surface of said backing by a binder.

15. A method for making alpha alumina-based ceramic abrasive grain, said method comprising the steps of:
    (a) providing an alpha alumina-based ceramic precursor comprising alpha alumina precursor, manganese material, and nucleating material; and
    b) heating said ceramic abrasive grain precursor to a sintering temperature that is at least 20° C. less than the sintering temperature of a comparable alpha alumina-based ceramic precursor that is essentially free of manganese material, for a time sufficient to provide alpha alumina-based ceramic abrasive grain having a density of at least 95 percent of theoretical and alpha alumina crystallites having an average crystallite size of less than 1 micrometer.

16. The method according to claim 15 wherein the sintering temperature of step (b) is at least 50° C. less than the sintering temperature of a comparable alpha alumina-based ceramic precursor that is essentially free of manganese material.

17. The method according to claim 15 wherein the sintering temperature of step (b) is at least 100° C. less than the sintering temperature of a comparable alpha alumina-based ceramic precursor that is essentially free of manganese material.

18. The method according to claim 15 wherein the sintering temperature of step (b) is at least 150° C. less than the sintering temperature of a comparable alpha alumina-based ceramic precursor that is essentially free of manganese material.

19. The method according to claim 15 wherein said nucleating material is selected from the group consisting of alpha alumina, alpha iron oxide, a precursor of alpha iron oxide, and combinations thereof.

20. The method according to claim 19 wherein the sintering temperature of step (b) is at least 100° C. less than the sintering temperature of a comparable alpha alumina-based ceramic precursor that is essentially free of manganese material.

21. The method according to claim 15 wherein said nucleating material is selected from the group consisting of alpha iron oxide, a precursor of alpha iron oxide, and combinations thereof.

22. A method of making alpha alumina-based ceramic abrasive grain, said method comprising the steps of:
(a) providing an alpha alumina-based ceramic abrasive grain precursor comprising an amount of manganese material effective to reduce the transitional alumina to alpha alumina transformation temperature; and
(b) heating said alpha alumina-based ceramic abrasive grain precursor to provide alpha alumina-based ceramic abrasive grain, wherein said heating includes sintering in a non-oxidizing atmosphere.

23. The method according to claim 22 wherein said amount of manganese material is effective to reduce said transformation temperature by at least 50° C.

24. The method according to claim 22 wherein said amount of manganese material is effective to reduce said transformation temperature by at least 100° C.

25. The method according to claim 22 wherein said manganese material includes manganese oxide precursor.

26. The method according to claim 22 wherein said alpha alumina-based ceramic abrasive grain precursor comprises a sufficient amount of manganese material to provide in the range from about 0.1 to about 25 percent by weight manganese oxide in said alpha alumina-based ceramic abrasive grain, based on the total weight of said alpha alumina-based ceramic abrasive grain.

27. The method according to claim 26 wherein said alpha alumina-based ceramic abrasive grain precursor comprises a sufficient amount of manganese material to provide in the range from about 2 to about 15 percent by weight manganese oxide in said alpha alumina-based ceramic abrasive grain.

28. The method according to claim 22 wherein said non-oxidizing atmosphere is nitrogen.

29. The method according to claim 22 wherein said alpha alumina-based ceramic abrasive grain consists essentially of alpha alumina and manganese spinel.

30. The method according to claim 29 wherein said effective amount of manganese material is sufficient to reduce said transformation temperature by at least 50° C.

31. The method according to claim 29 wherein said effective amount of manganese material is sufficient to reduce said transformation temperature by at least 100° C.

32. The method according to claim 29 wherein said manganese material includes manganese oxide precursor.

33. The method according to claim 29 wherein said alpha alumina-based ceramic abrasive grain precursor comprises a sufficient amount of manganese material to provide in the range from about 0.1 to about 25 percent by weight manganese oxide in said alpha alumina-based ceramic abrasive grain, based on the total weight of said alpha alumina-based ceramic abrasive grain.

34. The method according to claim 33 wherein said alpha alumina-based ceramic abrasive grain precursor comprises a sufficient amount of manganese material to provide in the range from about 2 to about 15 percent by weight manganese oxide in said alpha alumina-based ceramic abrasive grain.

35. The method according to claim 29 herein said non-oxidizing atmosphere is nitrogen.

36. An abrasive grain comprising a ceramic alpha alumina-based material having an alpha alumina submicrometer, faceted microstructure and consisting essentially of alpha alumina, manganese oxide, and zirconium oxide, wherein said submicrometer, faceted microstructure is provided by the presence of:
(a) alumina;
(b) at least 0.1 percent by weight manganese oxide; and
(c) at least 0.1 percent by weight zirconium oxide, based on the total weight of said ceramic alpha alumina-based material, said ceramic alpha alumina-based material having a density of at least 90 percent of theoretical.

37. A method of making an abrasive grain comprising a ceramic alpha alumina-based material having a density of at least 90 percent of theoretical and an alpha alumina submicrometer, faceted microstructure provided by the presence of (i) alumina, (ii) at least 0.1 percent by weight manganese oxide, and (iii) at least 0.1 percent by weight secondary oxide selected from the group consisting of zirconium oxide, yttrium oxide lanthanum oxide, neodymium oxide, cerium oxide, praseodymium oxide, samarium oxide, gadolinium oxide, erbium oxide, ytterbium oxide, dysprosium oxide, hafnium oxide, and mixtures thereof, based on the total weight of said ceramic alpha alumina-based material, said method comprising the steps of:
(a) providing an alpha alumina-based ceramic abrasive grain precursor comprising (A) manganese material and (B) secondary oxide precursors thereof, and mixtures thereof; and
(b) heating said alpha alumina-based ceramic abrasive grain precursor to provide said alpha alumina-based ceramic abrasive grain.

38. The method according to claim 37, wherein said abrasive grain further comprises at least 0.1 percent by weight of an oxide selected from the group consisting of zinc oxide, magnesium oxide, nickel oxide, silicon oxide, chromium oxide, titanium oxide, cobalt oxide, and combinations thereof, based on the total weight of said alpha alumina-based ceramic abrasive grain.

39. The method according to claim 37 wherein said alpha alumina-based ceramic abrasive grain comprises about 0.1 to about 25 percent by weight manganese oxide, based on the total weight of said alpha alumina-based ceramic abrasive grain.

40. The method according to claim 37 wherein said alpha alumina-based ceramic abrasive grain comprises secondary oxide selected from the group consisting of lanthanum oxide, neodymium oxide, cerium oxide, praseodymium oxide, samarium oxide, gadolinium oxide, erbium oxide, ytterbium oxide, dysprosium oxide, and mixtures thereof; and an amount of manganese oxide in excess of manganese oxide that reacted during said heating to form material represented by the formula:

$$MnLnAl_{11}O_{19}$$

wherein
- Ln is one of lanthanum, neodymium, cerium, praseodymium, samarium, gadolinium, erbium, ytterbium, dysprosium, or mixtures thereof;
- Mn is manganese,
- Al is aluminum, and
- O is oxygen.

41. The method according to claim 39 further comprising nucleating material.

42. The method according to claim 37 further comprising alpha alumina seeds.

43. A method for making alpha alumina-based ceramic abrasive grain, said method comprising the steps of:
   (a) providing an alpha alumina-based ceramic precursor comprising an amount of manganese material effective to reduce the transitional to alpha alumina transformation temperature and a sufficient amount of rare earth material selected from the group consisting of lanthanum oxide, neodymium oxide, cerium oxide, praseodymium oxide, samarium oxide, gadolinium oxide, erbium oxide, ytterbium oxide, dysprosium oxide, precursors thereof, and mixtures thereof; and
   (b) heating said alpha alumina-based ceramic abrasive grain precursor to provide alpha alumina-based ceramic abrasive grain comprising at least 0.1 rare earth oxide selected from the group consisting of lanthanum oxide, neodymium oxide, cerium oxide, praseodymium oxide, samarium oxide, gadolinium oxide, erbium oxide, ytterbium oxide, dysprosium oxide, and mixtures thereof, based on the total weight of said alpha alumina ceramic abrasive grain.

44. The method according to claim 43 wherein said amount of manganese material is effective to reduce said transformation temperature by at least 50° C.

45. The method according to claim 44 wherein said manganese material includes manganese oxide precursor.

46. The method according to claim 45 wherein said alpha alumina-based ceramic abrasive grain comprises about 0.1 to about 25 percent by weight manganese oxide, based on the total weight of said alpha alumina-based ceramic abrasive grain.

47. The method according to claim 45 wherein said alpha alumina-based ceramic abrasive grain comprises about 2 to about 15 percent by weight manganese oxide in said alpha alumina-based ceramic abrasive grain, based on the total weight of said alpha alumina-based ceramic abrasive grain.

48. The abrasive grain according to claim 1 wherein said abrasive grain is a rod.

49. The abrasive article according to claim 6 wherein said abrasive grain is a rod.

50. The abrasive grain according to claim 11 wherein said abrasive grain is a rod.

51. The abrasive grain according to claim 12 wherein said abrasive grain is a rod.

* * * * *

UNITED STATES PATENT AND TRADEMARK OFFICE
CERTIFICATE OF CORRECTION

PATENT NO.    : 5,690,707
DATED         : November 25, 1997
INVENTOR(S)   : William P. Wood and Henry A. Larmie It is certified that error appears in the above-identified patent and that said Letters Patent is hereby corrected as shown below:

<u>Column 41,</u>
Line 8, "claim 39" should read -- claim 37 --;

Signed and Sealed this

Ninth Day of July, 2002

Attest:

Attesting Officer

JAMES E. ROGAN
*Director of the United States Patent and Trademark Office*